US009553646B1

(12) United States Patent
Zhou

(10) Patent No.: US 9,553,646 B1
(45) Date of Patent: Jan. 24, 2017

(54) WIRELESS COMMUNICATION DEVICE, WIRELESS COMMUNICATION SYSTEM, AND TRANSMISSION-DATA CONTROL METHOD

(71) Applicant: FUJITSU LIMITED, Kawasaki-shi, Kanagawa (JP)

(72) Inventor: Liang Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/239,452

(22) Filed: Aug. 17, 2016

(30) Foreign Application Priority Data

Sep. 18, 2015 (JP) ................................. 2015-186018

(51) Int. Cl.
H04B 7/04 (2006.01)
H04B 7/06 (2006.01)
H04L 25/02 (2006.01)

(52) U.S. Cl.
CPC .......... *H04B 7/0486* (2013.01); *H04B 7/0632* (2013.01); *H04L 25/0202* (2013.01); *H04B 7/0639* (2013.01)

(58) Field of Classification Search
CPC ... H04B 7/0486; H04B 7/0632; H04B 7/0639; H04L 25/0202
See application file for complete search history.

(56) References Cited

U.S. PATENT DOCUMENTS

| 2011/0032839 | A1* | 2/2011 | Chen | H04B 7/024 370/252 |
| 2011/0142147 | A1* | 6/2011 | Chen | H04L 25/03343 375/260 |
| 2013/0028341 | A1  | 1/2013 | Ayach et al. | |
| 2015/0131753 | A1* | 5/2015 | Maruta | H04B 7/0473 375/267 |

FOREIGN PATENT DOCUMENTS

JP 2014-526191 10/2014
WO 2013015664 1/2013

* cited by examiner

Primary Examiner — Jean B Corrielus
(74) Attorney, Agent, or Firm — Fujitsu Patent Center

(57) ABSTRACT

A reception device includes an estimating unit, a rank identifying unit, a stream-number determining unit, a precoding-matrix determining unit, and a transmitting unit. The estimating unit receives a known signal transmitted from a transmission device, and estimates a channel between the transmission device and the wireless communication device and a reception signal quality. The rank identifying unit identifies a rank of a propagation path based on the estimated channel. The stream-number determining unit determines the number of data streams based on the estimated reception signal quality and the identified rank. The precoding-matrix determining unit determines a precoding matrix based on the estimated reception signal quality and the determined number of data streams. The transmitting unit transmits information relating to the determined number of data streams and the determined precoding matrix to the transmission device.

10 Claims, 21 Drawing Sheets

| INDEX (500) | MCS (501) | THROUGHPUT (502) |
|---|---|---|
| M001 | 16QAM-1/2 | 2.772 Gbps |
| M002 | 16QAM-3/4 | 4.158 Gbps |
| ⋮ | ⋮ | ⋮ |

| RANK | THRESHOLD [dB] | | |
|---|---|---|---|
| 1 | -6 | 4 | 12 |
| 2 | -10 | -6 | 2 |
| 3 | -10 | -10 | -6 |
| 4 | -10 | -10 | -6 |

| | 512 | 513 | |
|---|---|---|---|
| RANK | THRESHOLD | | |
| 1 | $t_{11}$ | $t_{12}$ | $t_{13}$ |
| 2 | $t_{21}$ | $t_{22}$ | $t_{23}$ |
| 3 | $t_{31}$ | $t_{32}$ | $t_{33}$ |
| 4 | $t_{41}$ | $t_{42}$ | $t_{43}$ |

FIG.19

| RANK | NUMBER OF STREAMS | | | |
|---|---|---|---|---|
| | 1 | 2 | 3 | 4 |
| 1 | $\rho < t_{11}$ | $t_{11} \leq \rho < t_{12}$ | $t_{12} \leq \rho < t_{13}$ | $t_{13} \leq \rho$ |
| 2 | $\rho < t_{21}$ | $t_{21} \leq \rho < t_{22}$ | $t_{22} \leq \rho < t_{23}$ | $t_{23} \leq \rho$ |
| 3 | $\rho < t_{31}$ | $t_{31} \leq \rho < t_{32}$ | $t_{32} \leq \rho < t_{33}$ | $t_{33} \leq \rho$ |
| 4 | $\rho < t_{41}$ | $t_{41} \leq \rho < t_{42}$ | $t_{42} \leq \rho < t_{43}$ | $t_{43} \leq \rho$ |

WIRELESS COMMUNICATION DEVICE, WIRELESS COMMUNICATION SYSTEM, AND TRANSMISSION-DATA CONTROL METHOD

CROSS-REFERENCE TO RELATED APPLICATION(S)

This application is based upon and claims the benefit of priority of the prior Japanese Patent Application No. 2015-186018, filed on Sep. 18, 2015, the entire contents of which are incorporated herein by reference.

FIELD

The embodiments discussed herein are related to a wireless communication device, a wireless communication system, and a transmission-data control method.

BACKGROUND

Multi-input and multi-output (MIMO) communication systems in which a transmission device and a reception device perform communication using an antenna array having multiple antennas have been known. Moreover, with the recent increase of communication band, communication using millimeter-waves has been considered to be applied. The millimeter-waves have large space propagation loss compared to electric waves of ultra-high frequency (UHF) band. Therefore, in the communication using millimeter-waves, the MIMO communication technique is applied to perform beam forming, thereby improving the communication quality.

Moreover, in the MIMO communication system, a wireless communication system in which a radio frequency (RF) precoding matrix including a phase shift relative to a transmission signal and a baseband precoding matrix to pre-code a transmission signal in a baseband are calculated has been known. In such a wireless communication system, a data signal having the number of data streams according to a rank acquired from a channel between a transmission device and a reception device is pre-coded by the calculated precoding matrix, and transmitted from the transmission device to the reception device. Related-art example is described in Japanese National Publication of International Patent Application No. 2014-526191.

When a data signal is transmitted from the transmission device with the number of data streams according to the rank, depending on a propagation environment between the transmission device and the reception device, the data signal received by the reception device can include many errors. In this case, retransmission of the data signal occurs frequently, and the throughput of data transmitted by the transmission device decreases. On the other hand, depending on a propagation environment between the transmission device and the reception device, a data signal can be received including a small number of errors by the reception device even if the data signal is transmitted with the number of data streams larger than the number of data streams according to the rank. However, as the number of streams is fixedly determined according to the rank, the throughput remains at a certain value, even though there is a possibility of improvement in the throughput.

SUMMARY

According to an aspect of an embodiment, a wireless communication device includes an estimating unit, an identifying unit, a first determining unit, a second determining unit, and a transmitting unit. The estimating unit receives a known signal transmitted from a transmission device, and estimates a channel between the transmission device and the wireless communication device and a reception signal quality. The identifying unit identifies a rank of a propagation path based on the channel estimated by the estimating unit. The first determining unit determines number of data streams based on the reception signal quality estimated by the estimating unit and the rank identified by the identifying unit. The second determining unit determines a precoding matrix based on the reception signal quality estimated by the estimating unit and the number of data streams determined by the first determining unit. The transmitting unit transmits information about the number of data streams determined by the first determining unit and the precoding matrix determined by the second determining unit to the transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 16 depicts one example of a throughput table;

FIG. 17 depicts one example of a threshold table;

FIG. 18 is a diagram for explaining a method of using the threshold table;

FIG. 19 is a diagram for explaining a method of using the threshold table;

DESCRIPTION OF EMBODIMENT(S)

Preferred embodiments of the present invention will be explained with reference to accompanying drawings. The disclosed technique is not limited to the following embodiments. The embodiments can be combined appropriately within a range not causing a contradiction in processing.

[a] First Embodiment

Wireless Communication System 10

Figure 1:
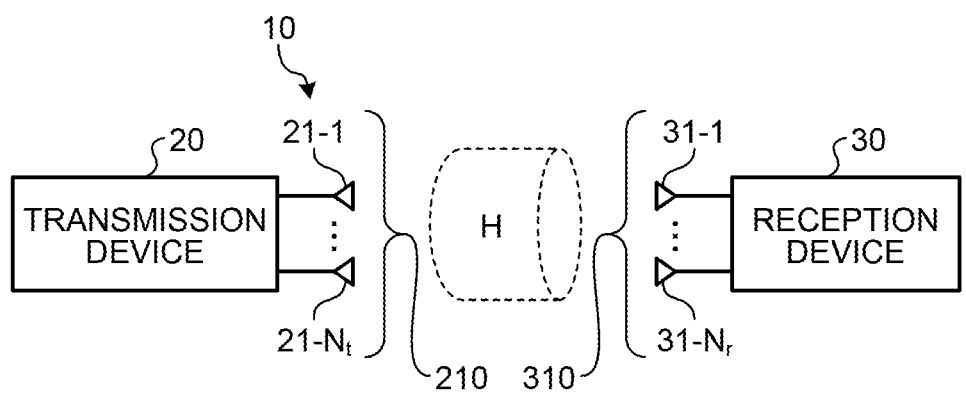
FIG. 1 depicts one example of a wireless communication system.

FIG. 1 depicts one example of a wireless communication system 10. The wireless communication system 10 includes a transmission device 20 and a reception device 30. The transmission device 20 and the reception device 30 in the present embodiment use millimeter-waves to perform wireless communication through a propagation path having channel H. The wireless communication system 10 is used for communication in, for example, a data center, a backhaul, and the like. Moreover, the wireless communication system 10 may be used in a wireless local area network (WLAN) or a wireless personal area network (WPAN).

The transmission device 20 has an array antenna 210 including $N_t$ units of transmission antennas 21-1 to 21-$N_t$. Furthermore, the reception device 30 has an array antenna 310 including $N_r$ units of reception antennas 31-1 to 31-$N_r$. $N_t$ and $N_r$ are integers equal to or larger than 2. In the following, the transmission antennas 21-1 to 21-$N_t$ are expressed as a transmission antenna 21 when collectively referred without distinguishing each of the transmission antennas 21-1 to 21-$N_t$, and the reception antennas 31-1 to 31-$N_r$ are expressed as a reception antenna 31 when collectively referred without distinguishing each of the reception antennas 31-1 to 31-$N_r$. Moreover, although the transmission device 20 and the reception device 30 are explained separately in the present embodiment for convenience sake, the transmission device 20 and the reception device 30 may be configured to have both a transmission function and a reception function.

Transmission Device 20

Figure 2:
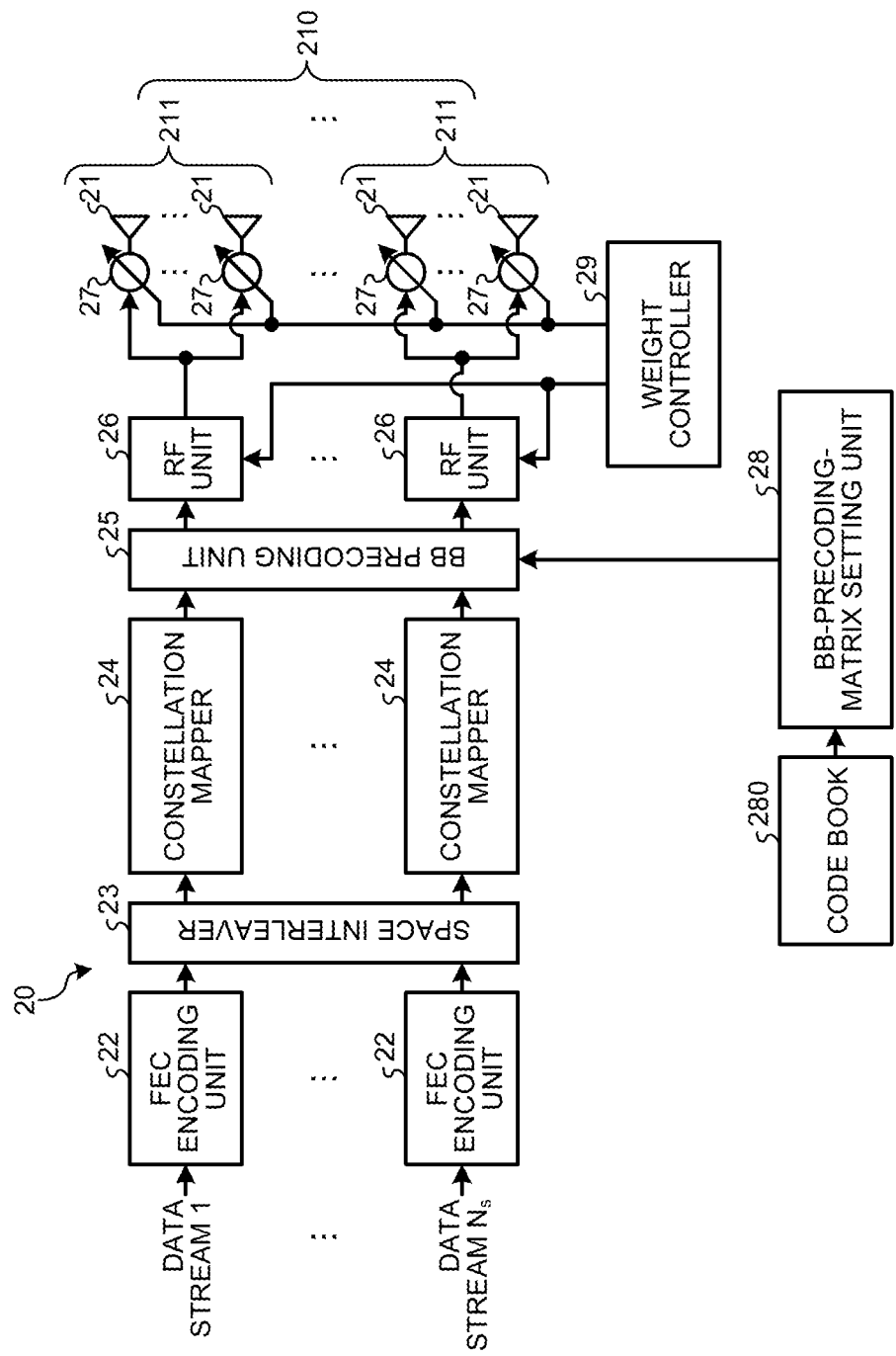
FIG. 2 is a block diagram depicting one example of a transmission device in a first embodiment.

FIG. 2 is a block diagram depicting one example of the transmission device 20 in the first embodiment. The transmission device 20 includes the multiple transmission antennas 21, multiple forward-error-correction (FEC) encoding units 22, a space interleaver 23, multiple constellation mappers 24, and a baseband (BB) precoding unit 25. Furthermore, the transmission device 20 includes multiple RF units 26, multiple weight setting units 27, a BB-precoding-matrix setting unit 28, a code book 280, and a weight controller 29.

In the present embodiment, N units of the RF units 26 are provided. In the present embodiment, the number N of the RF units 26 is larger than or equal to the maximum number for the number $N_s$ of data streams. Moreover, the transmission antennas 21 are divided into N pieces of subarrays 211 for each of the RF units 26. Each of the subarrays 211 includes $N_{sbt}$ units of the transmission antennas 21. N and $N_{sbt}$ are integers equal to or larger than 2.

In the present embodiment, the FEC encoding units 22, the space interleaver 23, the constellation mapper 24, the BB precoding unit 25, the RF unit 26, the weight setting unit 27, the BB-precoding-matrix setting unit 28, and the weight controller 29 are implemented by an LSI, and the like. LSI is an abbreviation of a large-scale integration. Note that at least a part of the above functions may be implemented by a logical circuit device, such as a programmable logic device (PLD) and a field programmable gate array (FPGA), which are programmable. Furthermore, the transmission device 20 has a processor device and a storage device, and at least a part of the above functions may be implemented by executing a program stored in the storage device by the processor device. The processor device is, for example, a central processing unit (CPU), or a digital signal processor (DSP), and the storage device is, for example, a random access memory (RAM), a read only memory (ROM), a solid state drive (SSD), or the like.

Each of the FEC encoding units 22 encodes a transmission bit sequence included in a data stream by a convolutional code of a predetermined code rate, and the like. Each of the FEC encoding units 22 performs encoding with a code rate in accordance with a modulation and coding scheme (MCS) that has been informed by the reception device 30. The transmission bit sequence encoded by the FEC encoding unit 22 is output to the space interleaver 23. In the present embodiment, the number of data streams is expressed by $N_s$. $N_s$ is an integer equal to or larger than 1.

The space interleaver 23 performs space interleave per data stream by switching bit positions of the transmission bit sequence output from each of the FEC encoding unit 22. The space interleaver 23 outputs the transmission bit sequence after interleave to each of the constellation mappers 24 per data stream.

Each of the constellation mappers 24 maps the transmission bit sequence included in the data stream output from the space interleaver 23 to symbols according to a predetermined modulation scheme such as 16 quadrature amplitude modulation (QAM). The constellation mapper 24 outputs the data stream subjected to the mapping to the BB precoding unit 25. Each of the constellation mappers 24 modulates the transmission bit sequence included in the data stream by using a modulation scheme in accordance with the MCS informed by the reception device 30.

The BB precoding unit 25 multiplies the BB precoding matrix set by the BB-precoding-matrix setting unit 28 by $N_s$ pieces of data streams output from the respective constellation mappers 24. The BB precoding unit 25 then maps the $N_s$ pieces of data streams to the N units of the RF units 26, respectively.

The code book 280 stores multiple BB precoding matrixes for each number of data streams. With each of the BB precoding matrixes, an index is associated. When receiving an index and the number of data streams from the reception device 30, the BB-precoding-matrix setting unit 28 refers to the code book 280, and identifies BB precoding matrixes that are associated with the number of data streams. The BB-precoding-matrix setting unit 28 further identifies a BB precoding matrix with which the index received from the reception device 30 is associated from among the identified BB precoding matrixes. The BB-precoding-matrix setting unit 28 then sets the identified BB precoding matrix in the BB precoding unit 25.

Each of the RF units 26 subjects the signal mapped by the BB precoding unit 25 to processing such as digital-analog conversion, quadrature modulation, and up-conversion. The RF unit 26 outputs the processed signal to the weight setting unit 27 that is connected to the corresponding subarray 211. Each of the RF units 26 transmits a reference signal having a known data sequence to the reception device 30 through the transmission antenna 21 according to an instruction from the weight controller 29 when the RF precoding matrix and the BB precoding matrix are calculated. The reference signal may be, for example, a pilot signal, or the like.

The weight controller 29 generates, for each of the subarrays 211, a transmission-antenna weight vector (hereinafter, "transmission AWV") that includes a weight to be set to each of the transmission antennas 21 in the subarray 211. With the transmission AWV set to the subarray 211, the subarray 211 emits a transmission beam in a predetermined pattern. The weight controller 29 outputs the weights included in the transmission AWV generated for each of the subarrays 211 to the respective weight setting units 27.

The weight setting unit 27 multiplies the signal output from the RF unit 26 by the weight output from the weight controller 29, thereby changing the phase of the signal output from the RF unit 26. As a result of changing the phase of the signal output from the RF unit 26 by the weight setting unit 27 included in the subarray 211, a transmission beam having a directivity in a predetermined direction is emitted from the subarray 211.

Reception Device 30

Figure 3:
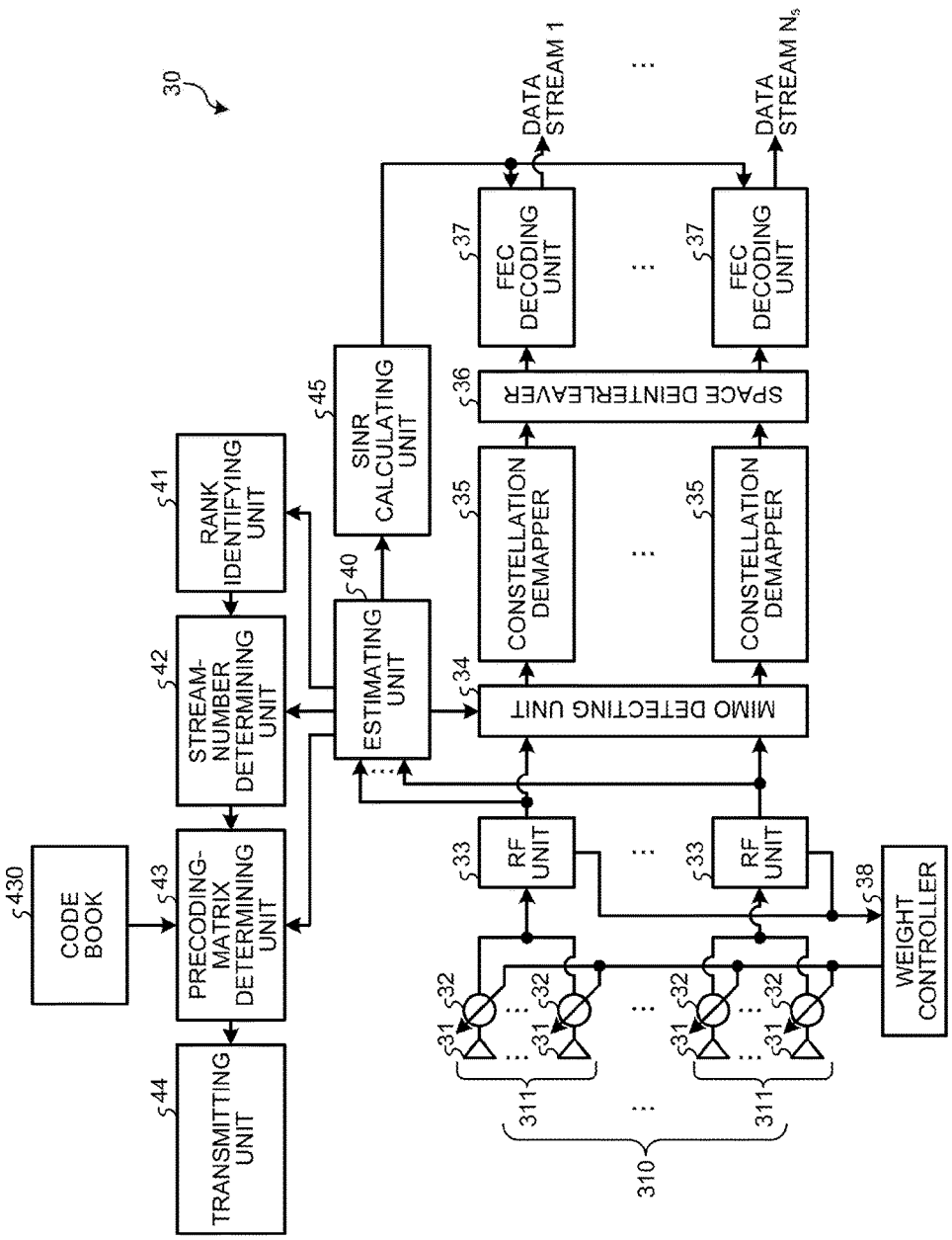
FIG. 3 is a block diagram depicting one example of a reception device in the first embodiment.

FIG. 3 is a block diagram depicting one example of the reception device 30 in the first embodiment. The reception device 30 includes the multiple reception antennas 31, multiple weight setting units 32, multiple RF units 33, a MIMO detecting unit 34, multiple constellation demappers 35, a space deinterleaver 36, multiple FEC decoding units 37, and a weight controller 38. Moreover, the reception device 30 includes an estimating unit 40, a rank identifying unit 41, a stream-number determining unit 42, a precoding-matrix determining unit 43, a code book 430, a transmitting unit 44, and a signal-to-interference-plus-noise-power-ratio (SINR) calculating unit 45.

In the present embodiment, N units of the RF units 33 are provided. Furthermore, the reception antennas 31 are divided into N units of subarrays 311 for each of the RF units 33. Each of the subarrays 311 includes $N_{sbr}$ units of the reception antennas 31. $N_{sbr}$ is an integer equal to or larger than 2. Moreover, in the present embodiment, the weight setting unit 32, the RF units 33, the MIMO detecting unit 34, the constellation demapper 35, the space deinterleaver 36, the FEC decoding unit 37, and the weight controller 38 are implemented by an LSI, and the like. Furthermore, in the present embodiment, the estimating unit 40, the rank identifying unit 41, the stream-number determining unit 42, the precoding-matrix determining unit 43, the transmitting unit 44, and the SINR calculating unit 45 are implemented by an LSI, and the like. Note that at least a part of the above functions may be implemented by a logical circuit device. Furthermore, the reception device 30 has a processor device and a storage device, and at least a part of the above functions may be implemented by executing a program stored in the storage device by the processor device.

The weight controller 38 generates, for each of the subarrays 311, a reception-antenna weight vector (hereinafter, "reception AWV") that includes a weight to be set to each of the reception antennas 31 in the subarray 311. The weight controller 38 outputs the weights included in the reception AWV generated for each of the subarrays 311 to the respective weight setting units 32.

The weight setting unit 32 multiplies the signal received by the reception antenna 31 by the weight output from the weight controller 38, thereby changing the phase of the signal received by the reception antenna 31. As a result of changing the phase of the signal received through the reception antenna 31 by the weight setting unit 32 included in the subarray 311, a reception beam having a directivity in a predetermined direction is formed in the subarray 311.

Each of the RF units 33 subjects the signal, the phase of which is changed by the weight setting unit 32 included in the corresponding subarray 311 to processing such as down conversion, quadrature detection, and analog-digital conversion. The RF unit 33 outputs the processed signal to the MIMO detecting unit 34 and the estimating unit 40.

The MIMO detecting unit 34 subjects the signal output from each of the RF units 33 to MIMO detection processing based on a MIMO channel that is estimated by the estimating unit 40, thereby separating $N_s$ pieces of data streams. As the MIMO detection processing, a zero-forcing (ZF) method, a minimum mean square error (MMSE) method, a maximum likelihood detection (MLD) method, and the like can be used. The MIMO detecting unit 34 outputs the separated $N_s$ pieces of data streams to the respective constellation demappers 35.

Each of the constellation demappers 35 decodes the data streams output from the MIMO detecting unit 34 based on a demodulation scheme corresponding to the modulation scheme applied in the transmission device 20. The constellation demapper 35 then outputs the reception bit sequence subjected to the demodulation to the space deinterleaver 36.

The space deinterleaver 36 subjects the reception bit sequence output from each of the constellation demappers 35 to space deinterleave per data stream by returning bit positions that have been switched by the transmission device 20 back to the original positions. The space deinterleaver 36 then outputs the reception bit sequence subjected to deinterleave to the FEC decoding unit 37 per data stream.

Each of the FEC decoding units 37 subjects the reception bit sequence output from the space deinterleaver 36 to decoding based on Viterbi algorithm, based on the SINR output from the SINR calculating unit 45 per data stream. Each of the FEC decoding units 37 outputs a decoded data stream.

The estimating unit 40 estimates a MIMO channel and a signal-to-noise ratio (SNR) in a baseband between the transmission device 20 and the reception device 30 based on a reference signal included in the signal output from each of the RF units 33. The SNR is one example expressing the reception signal quality. The estimating unit 40 outputs the estimated MIMO channel and SNR to the MIMO detecting unit 34, the rank identifying unit 41, the stream-number determining unit 42, the precoding-matrix determining unit 43, and the SINR calculating unit 45. Note that the estimating unit 40 estimates a MIMO channel and an SNR after an RF precoding matrix including weights to be set to the respective weight setting units 32 by the weight controller 38 is calculated.

The SINR calculating unit 45 calculates an SINR of the reception signal based on the MIMO channel and the SNR estimated by the estimating unit 40. The SINR calculating unit 45 outputs the calculated SINR to the respective FEC decoding units 37.

The rank identifying unit 41 identifies a rank of a propagation path between the transmission device 20 and the reception device 30 based on the MIMO channel and the SNR of the baseband estimated by the estimating unit 40. The rank identifying unit 41 outputs information about the calculated rank to the stream-number determining unit 42. The rank identifying unit 41 is one example of an identifying unit. The identification procedure of a rank is described later.

The stream-number determining unit 42 determines a combination of an MCS and number of data streams based on the SNR estimated by the estimating unit 40 and the rank identified by the rank identifying unit 41. The stream-number determining unit 42 outputs the determined combination of an MCS and the number of data streams to the precoding-matrix determining unit 43. The stream-number determining unit 42 is one example of a first determining unit. A determination procedure of an MCS and number of data streams is described later.

The code book 430 stores multiple BB precoding matrixes for each number of data streams. With each of the BB precoding matrixes, an index is associated. The code book 430 has the same contents as the code book 280 held by the transmission device 20. The precoding-matrix determining unit 43 refers to the code book 430, and identifies BB precoding matrixes that are associated with the number of data streams determined by the stream-number determining unit 42. The precoding-matrix determining unit 43 determines a BB precoding matrix that satisfies a predetermined selection criterion from among the identified BB precoding matrixes, by using the SNR estimated by the estimating unit 40. The precoding-matrix determining unit 43 then outputs the index that is associated with the determined BB precoding matrix together with the MCS and the number of data streams determined by the stream-number determining unit 42, to the transmitting unit 44. The precoding-matrix determining unit 43 is one example of a second determining unit.

The transmitting unit 44 transmits the index, the MCS, and the number of data streams that are output from the precoding-matrix determining unit 43 to the transmission device 20 through a not illustrated transmission system. The transmitting unit 44 may transmit information about the index, the MCS, and the number of data streams to the transmission device 20 by wireless communication, or by a wired communication.

A baseband reception signal y that is received by the reception device 30 is expressed by Equation (1) below.

$$y = C^H H W P s + C^H n \tag{1}$$

In Equation (1) above, H is a channel of a propagation path between the transmission device 20 and the reception device 30, and P is a BB precoding matrix that is set by the BB precoding unit 25 of the transmission device 20. Moreover, s is a transmission data signal, and n is a noise vector. Furthermore, $C^H$ is Hermitian transpose of C.

Moreover, in above Equation (1), W is a transmission weight matrix that is constituted of weights set by the respective weight setting units 27 of the transmission device 20, and is expressed by Equations (2) and (3) below. In the following, the transmission weight matrix is referred to as an RF precoding matrix in the transmission device 20 in some cases.

$$W = \mathrm{diag}\{w^1, w^2, \ldots, w^N\} \tag{2}$$
$$= \begin{bmatrix} w^1 & 0 & \cdots & 0 \\ 0 & w^2 & \cdots & 0 \\ \vdots & \vdots & \ddots & \vdots \\ 0 & 0 & \cdots & w^N \end{bmatrix}$$

$$w^i = [w_1^i, w_2^i, \ldots, w_{Nsbt}^i]^T \tag{3}$$

Furthermore, in Equation (1) above, C is a reception weight matrix that is constituted of weights set by the respective weight setting units 32 of the reception device 30, and is expressed by Equations (4) and (5) below. In the following, the reception weight matrix is referred to as an RF precoding matrix in the reception device 30 in some cases.

$$C = \mathrm{diag}\{c^1, c^2, \ldots, c^N\} \tag{4}$$

$$c^i = [c_1^i, c_2^i, \ldots, c_{Nsbr}^i]^T \tag{5}$$

Moreover, in above Equation (1), an equivalent MIMO channel $H_b$ before BB precoding is expressed, for example, as Equation (6) below.

$$H_b = C^H H W \tag{6}$$

Furthermore, an equivalent MIMO channel capacity $C_b$ is expressed, for example, as Equation (7) below.

$$C_b = \log_2(\det(I_N + \rho H_b^H H_b / N)) \tag{7}$$

$\rho$ is an SNR of a reception signal, and $I_N$ is a unit matrix in which both numbers of rows and columns are N. Furthermore, det (X) indicates a determinant of a matrix X.

Arrangement of Antennas

Figure 4:
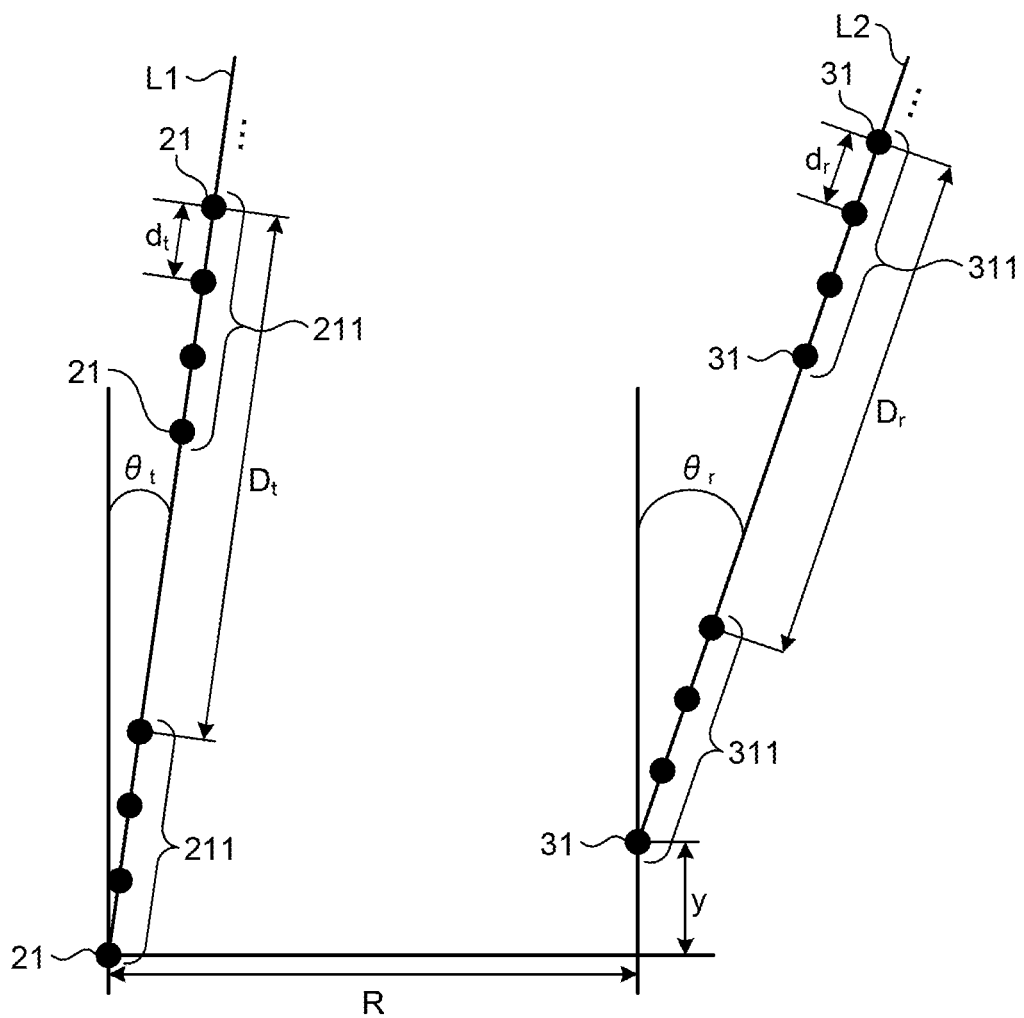
FIG. 4 depicts one example of arrangement of antennas.

FIG. 4 depicts one example of arrangement of antennas. Suppose, for example, as depicted in FIG. 4, the transmission antennas 21 are arranged on a straight line L1 that forms an angle $\theta_t$ relative to a reference direction, and the reception antennas 31 are arranged on a straight line L2 that forms an angle $\theta_r$ relative to the reference direction. Moreover, in the example in FIG. 4, a distance between the adjacent subarrays 211 is $D_t$, and a distance between the adjacent transmission antennas 21 is $d_t$ in each of the subarrays 211. Furthermore, in the example in FIG. 4, a distance between the adjacent subarrays 311 is $D_r$, and a distance between the adjacent reception antennas 31 is $d_r$ in each of the subarrays 311. Furthermore, in the example in FIG. 4, a distance between the respective transmission antennas 21 and the respective reception antennas 31 in the reference direction is y, and a distance therebetween in a direction perpendicular to the reference direction is R.

When the distance y is 0, and the angle $\theta_t$ and the angle $\theta_r$ are both 0°, by arranging the transmission antennas 21 and the reception antennas 31 to satisfy Equation (8) below, for example, communication capacity is maximized.

$$D_r D_t = \frac{\lambda R}{N} \tag{8}$$

$\lambda$ is a wavelength of a carrier frequency, and N is the number of the subarrays 211 or the subarrays 311. For example, in the millimeter-wave communication, when R is about 10 meters (m), $D_t$ and $D_r$ are set to, for example, about 5 centimeters (cm) to 20 cm. In the present embodiment, $d_t$ and $d_r$ are, for example, half the length of $\lambda$. Note that $d_t$ and $d_r$ may have a length within a range of ¼ times to 2 times as long as $\lambda$.

Figure 5:
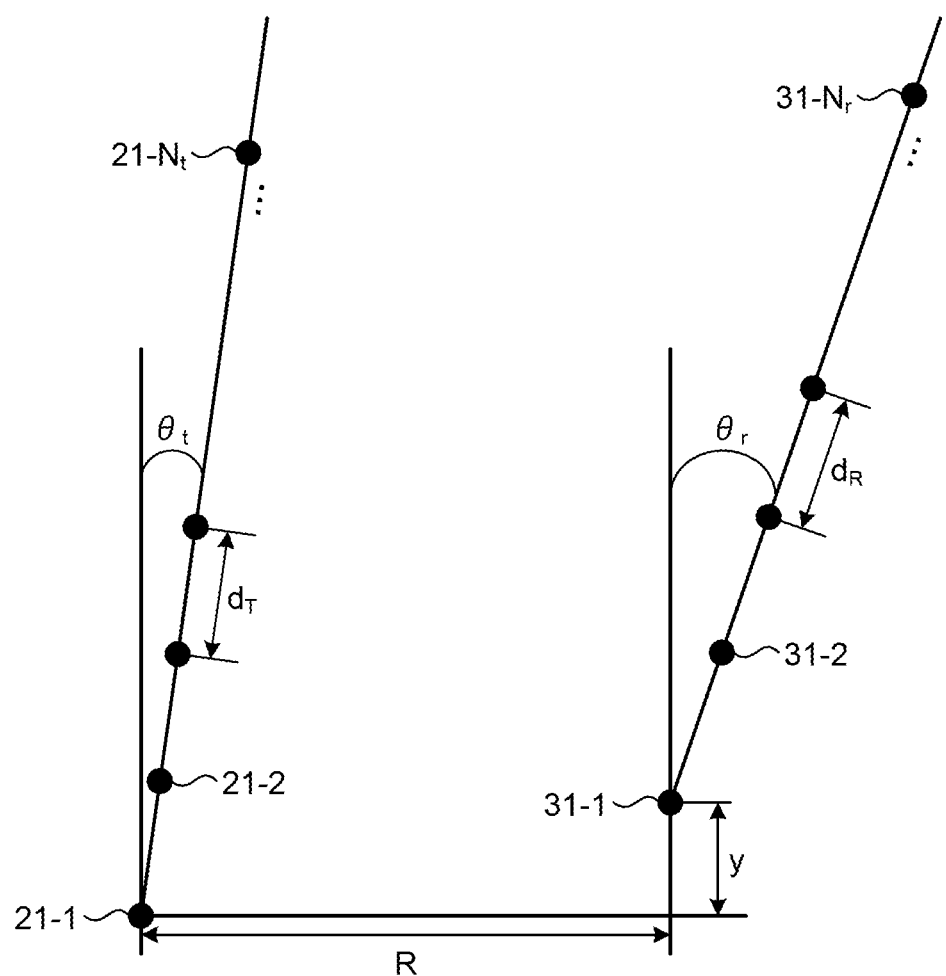
FIG. 5 depicts another example of arrangement of the antennas.

Moreover, the transmission antennas 21 and the reception antennas 31 may be arranged at regular intervals, for example, as depicted in FIG. 5. FIG. 5 depicts another example of arrangement of the antennas. In this case, a distance $d_T$ between the adjacent transmission antennas 21 and a distance $d_R$ between the adjacent reception antennas 31 are preferable to be longer than ½ the length of $\lambda$. The distances $d_T$ and $d_R$ may be set to, for example, distances expressed by Equation (9) below.

$$d_T = ((N-1)D_t + (N_t/N - 1)d_t)/N_t$$
$$d_R = ((N-1)D_r + (N_r/N - 1)d_r)/N_r \tag{9}$$

Operation of Wireless Communication System 10

Figure 6:
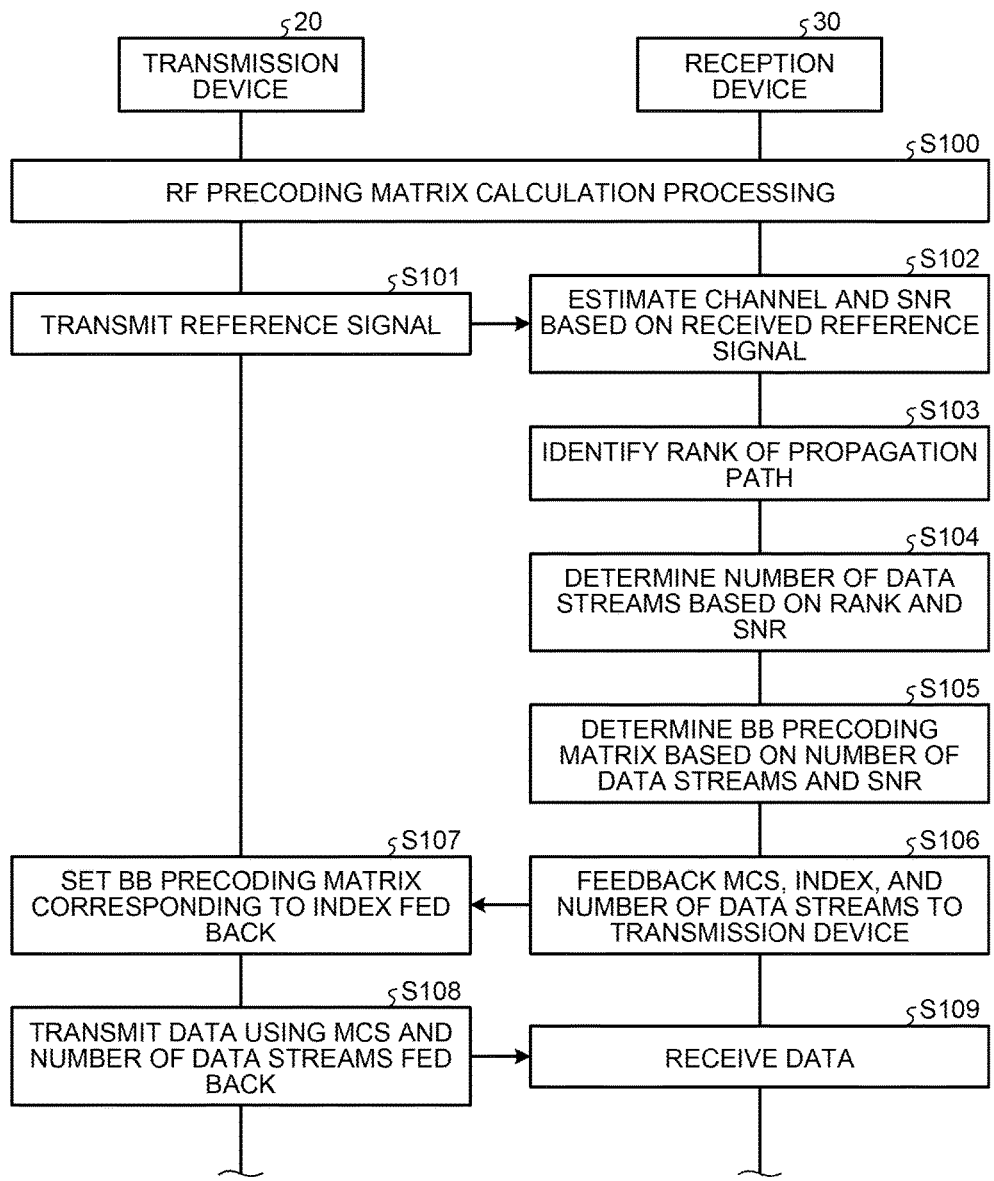
FIG. 6 is a sequence diagram depicting one example of operation of the wireless communication system.

FIG. 6 is a sequence diagram depicting one example of operation of the wireless communication system 10. The transmission device 20 and the reception device 30 perform the sequence depicted in FIG. 6, for example, prior to transmission and reception of a data signal. First, the transmission device 20 and the reception device 30 calculate an RF precoding matrix (S100).

When a MIMO channel $H^{i,i}$ between the i-th subarray 211 and the i-th subarray 311 has been known, subjected to SVD, the MIMO channel $H^{i,i}$ is expressed as Equation (10) below. SVD is an abbreviation of singular value decomposition.

$$H^{i,i} = U^{i,i} D^{i,i} (V^{i,i})^H \quad (10)$$

By applying SVD to the MIMO channel $H^{i,i}$, a transmission AWV $w^i$ of the i-th subarray 211 of the transmission device 20 is expressed by the first column in a right singular matrix $V^{i,i}$. Moreover, a reception AWV $c^i$ of the i-th subarray 311 of the reception device 30 is expressed by the first column of a left singular matrix $U^{i,i}$.

However, when acquisition of the MIMO channel $H^{i,i}$ is difficult, a combination that satisfies a predetermined criterion is identified from among combinations of multiple transmission AWVs set to the subarray 211 of the transmission device 20 and multiple reception AWVs set to the subarray 311 of the reception device 30. The transmission AWVs and the reception AWVs may be created as a code book in advance, and may be selected from the code book.

The combination that satisfies the predetermined criterion may be a combination that maximizes the SNR of the reception signal, for example, as indicated in Equation (11) below.

$$(\widetilde{w}^i, \widetilde{c}^i) = \max_{w^i \in W^i, c^i \in C^i} |(c^i)^H H^{i,i} w^i|^2 \quad (11)$$

In above Equation (11), a left side is an estimation value of the transmission AWV $w^i$, and an estimation value of the reception AWV $c^i$.

The combination that satisfies the predetermined criterion may be, for example, as expressed by Equation (12) below, a combination that maximizes the capacity of the equivalent MIMO channel.

$$(\widetilde{w}, \widetilde{c}) = \underset{w \in W_c, c \in C_c}{\mathrm{argmax}}\ C_b\left(\underbrace{\mathrm{diag}\{w, w, \ldots, w\}}_{N}, \underbrace{\mathrm{diag}\{c, c, \ldots, c\}}_{N}\right) \quad (12)$$

By setting the same transmission AWV to the respective subarrays 211 of the transmission device 20 and the same reception AWV to the respective subarrays 311 of the reception device 30, a combination that maximizes the equivalent MIMO channel capacity can be identified at high speed. Moreover, processing of identifying a combination of the transmission AWV and the reception AWV that maximizes the SNR and processing of identifying a combination of the transmission AWV and the reception AWV that maximizes the equivalent MIMO channel capacity may be combined to be applied.

Calculation Processing of RF Precoding Matrix

Figure 7:
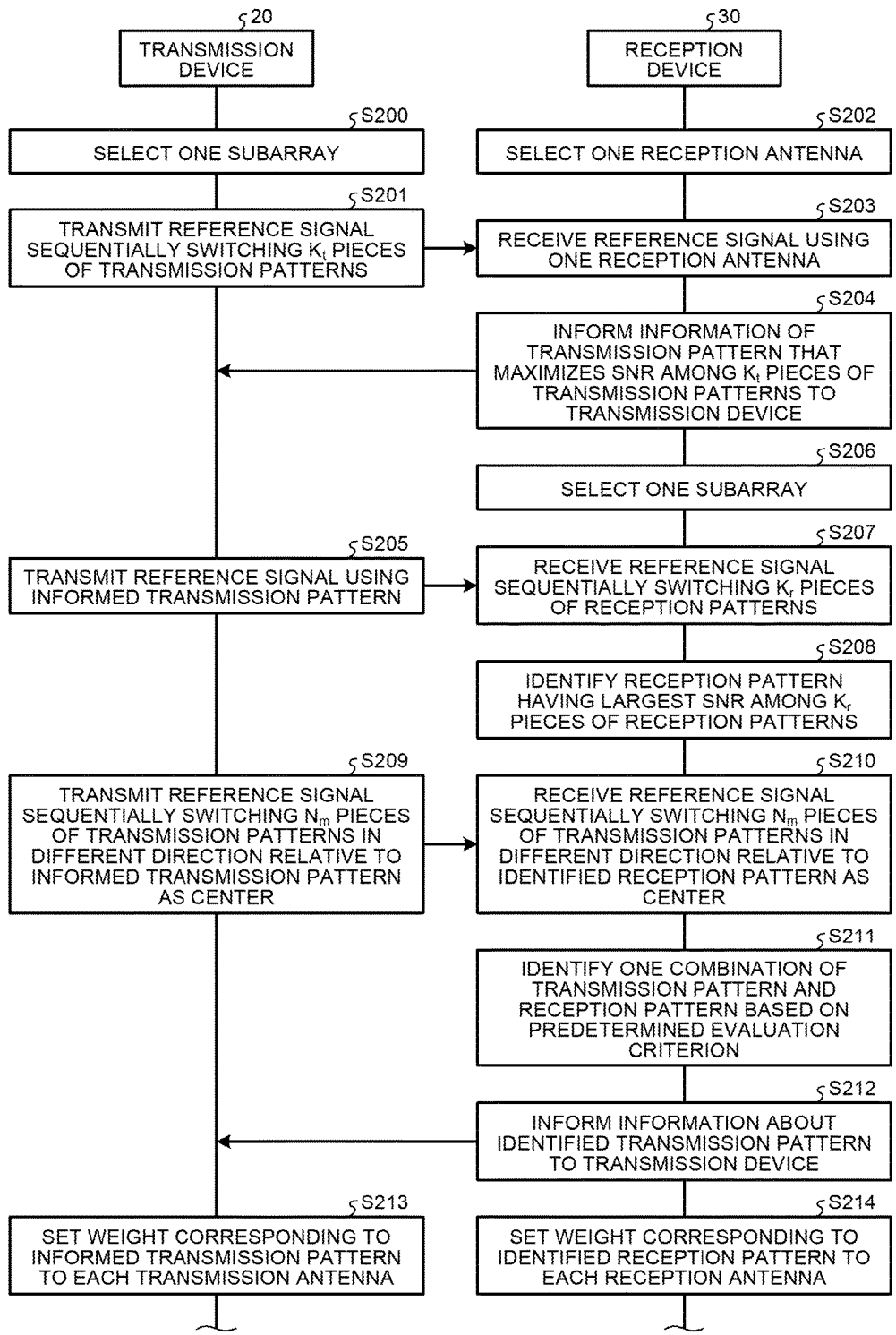
FIG. 7 is a sequence diagram depicting one example of calculation processing of an RF precoding matrix.

In the present embodiment, an RF precoding matrix is calculated by a following procedure on the precondition that acquisition of the MIMO channel $H^{i,i}$ is difficult. FIG. 7 is a sequence diagram depicting one example of the calculation processing of an RF precoding matrix.

First, the weight controller 29 of the transmission device 20 arbitrarily selects one unit of the subarrays 211 from among the multiple subarrays 211 (S200). The weight controller 29 creates $K_t$ pieces of the transmission AWVs to form various transmission patterns for the selected subarray 211. In the present embodiment, the weight controller 29 creates a weight w(m,k) of the m-th transmission antenna 21 when forming the k-th transmission beam pattern is to be created using discrete Fourier transform (DFT), for example, as expressed by Equation (13) below.

$$w(m,k) = \frac{1}{\sqrt{M}} e^{-j2\pi(m-1)(k-1)/K}, m = 1, M; k = 1, \ldots, K \quad (13)$$

In above Equation (13), M is the number of the transmission antennas 21 included in the subarray 211, and in the case of a transmission beam pattern, M is $N_{sbt}$. Furthermore, K is the total number of beam patterns, and in the case of a transmission beam pattern, K is $K_t$.

Figure 8:
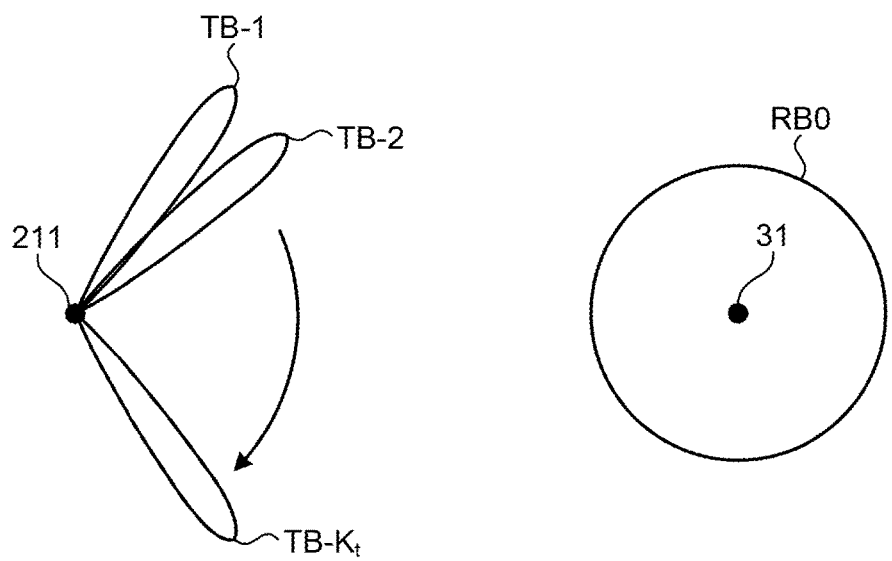
FIG. 8 is a diagram for explaining one example of a calculation procedure of the RF precoding matrix.

The weight controller 29 causes the RF unit 26 corresponding to the selected subarray 211 to output a known reference signal. The weight controller 29 sets the created transmission AWVs sequentially to the weight setting units 27 that are connected to the selected subarray 211. Thus, for example, as depicted in FIG. 8, the reference signal is transmitted from the selected subarray 211 in each of $K_t$ pieces of transmission patterns TB-1 to TB-$K_t$ sequentially switched thereamong (S201).

The weight controller 38 of the reception device 30 selects one unit of the reception antenna 31 arbitrarily from the multiple reception antennas 31 (S202). The RF unit 33 connected to the selected reception antenna 31 subjects a signal transmitted from the transmission device 20 through the reception antenna 31 to processing such as quadrature detection, and outputs the processed reception signal to the weight controller 38. The weight controller 38 extracts the reference signal from the signal output from the RF unit 33. Thus, the weight controller 38 receives the reference signal transmitted from the transmission device 20 using each of the $K_t$ pieces of transmission patterns, with the selected one reception antenna 31 in a non-directional reception pattern RB0, for example, as depicted in FIG. 8 (S203).

Subsequently, the weight controller 38 of the reception device 30 identifies a transmission pattern that maximizes the SNR of the received reference signal from among the $K_t$ pieces of the transmission patterns, based on, for example, Equation (11) described above. The weight controller 38 informs information about the identified transmission pattern to the transmission device 20 (S204).

Figure 9:
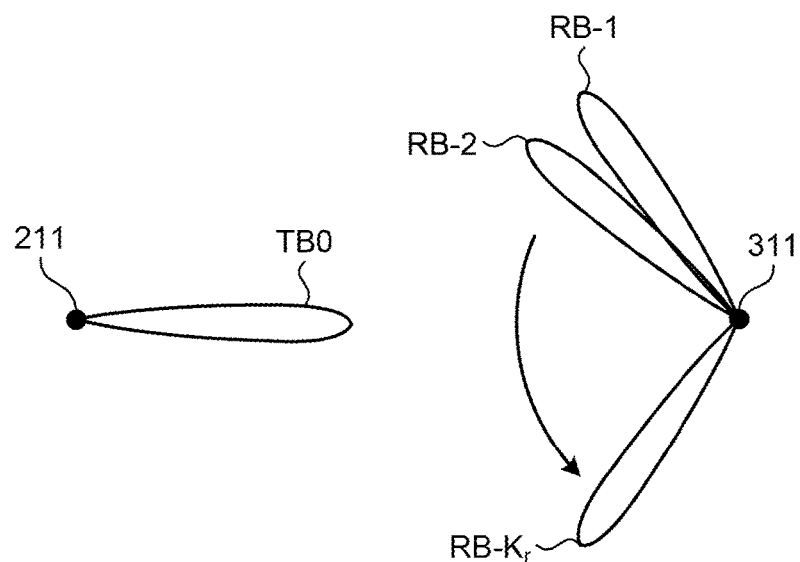
FIG. 9 is a diagram for explaining one example of the calculation procedure of the RF precoding matrix.

Subsequently, the weight controller 29 of the transmission device 20 sets the transmission AWV to form the transmission pattern informed by the reception device 30 to the weight setting units 27 connected to the subarray 211 selected at step S200. Thus, for example, as depicted in FIG. 9, the reference signal is transmitted from the selected subarray 211 in a transmission pattern TB0 informed by the reception device 30 (S205).

Subsequently, the weight controller 38 of the reception device 30 selects one unit of the subarray 311 that includes the reception antenna 31 selected at step S202 (S206). The weight controller 38 generates $K_r$ pieces of the reception AWVs to form various reception patterns for the selected subarray 311. The weight controller 38 generates the reception AWV of the $K_r$ pieces of reception beam patterns based on, for example, Equation (13) described above.

Subsequently, the weight controller 38 sets the generated reception AWVs sequentially to the multiple weight setting units 32 that are connected to the selected subarray 311. Thus, for example, as depicted in FIG. 9, the reference signal is received by the selected subarray 311 in each of the $K_r$ pieces of reception patterns RB-1 to RB-$K_r$ switched sequentially thereamong (S207).

Subsequently, the weight controller 38 of the reception device 30 identifies a reception pattern that maximizes the SNR of the received reference signal from among the $K_r$ pieces of the reception patterns, for example, based on Equation (11) described above (S208).

Subsequently, the weight controller 29 of the transmission device 20 creates transmission AWVs of $N_m$ pieces of transmission patterns TB0 to TB2 in different directions with the transmission pattern TB0 informed by the reception device 30 as the center. In the present embodiment, the weight controller 29 creates a weight WN(m,k) of the m-th transmission antenna 21 at the time of forming the k-th transmission beam pattern, for example, as expressed in Equation 14 below.

$$WN(m,k)=a(m)e^{j2\pi(m-1)(r_k-1)/(2*K)} \quad (14)$$

In above Equation (14), a(m) is a weight to be set to the m-th transmission antenna 21 in the transmission pattern TB0 informed by the reception device 30. In above Equation (14), a value of $N_m$ is used for K. In the present embodiment, $N_m$ is 3. $N_m$ may be 5, 7, or the like.

Figure 10:
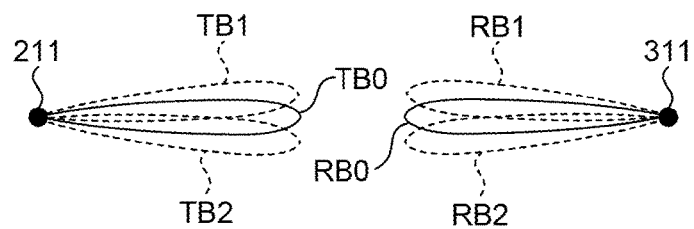
FIG. 10 is a diagram for explaining one example of the calculation procedure of the RF precoding matrix.

The weight controller 29 sets the created $N_m$ pieces of transmission AWVs sequentially to the multiple weight setting units 27 that are connected to the subarray 211 selected at step S200. Thus, for example, as depicted in FIG. 10, the reference signal is transmitted from the subarray 211 in each of the $N_m$ pieces of transmission patterns TB0 to TB2 sequentially switch thereamong (S209).

Subsequently, the weight controller 38 of the reception device 30 creates the reception AWVs of $N_m$ pieces of reception patterns RB0 to RB2 in different directions with the reception pattern RB0 identified at S208 as the center. The weight controller 38 sets the created $N_m$ pieces of reception AWVs sequentially to the multiple weight setting units 32 that are connected to the subarray 311 selected at step S206. Thus, for example, as depicted in FIG. 10, the reference signal that is transmitted from the transmission device 20 is received by the subarray 311 in each of the $N_m$ pieces of reception patterns RB0 to RB2 sequentially switch thereamong (S210).

Subsequently, the weight controller 38 of the reception device 30 identifies a combination that satisfies a predetermined evaluation criterion from among combinations of the respective $N_m$ pieces of transmission patterns and the respective $N_m$ pieces of reception patterns (S211). In the present embodiment, the weight controller 38 identifies one combination that maximizes the capacity of the equivalent MIMO channel from among the combinations of the respective $N_m$ pieces of transmission patterns and the respective $N_m$ pieces of reception patterns, based on above Equation (12), for example. The weight controller 38 may identify one combination of a transmission pattern and a reception pattern based on other evaluation criteria, such as an MMSE, maximum minimum SINR, and a minimum condition number.

Subsequently, the weight controller 38 of the reception device 30 informs information about the identified transmission pattern to the transmission device 20 (S212). The weight controller 29 of the transmission device 20 creates an RF precoding matrix that includes the transmission AWV to form the transmission pattern informed by the reception device 30 as a column vector. The weight controller 29 then sets weights of the respective subarrays 211 based on the created RF precoding matrix to the weight setting units 27 (S213). Furthermore, the weight controller 38 of the reception device 30 creates an RF precoding matrix that includes the reception AWV to form the reception pattern identified at step S212 as a column vector. The weight controller 38 then sets weights of the respective subarrays 311 to the weight setting unit 32 based on the created RF precoding matrix (S214). Thus, the transmission device 20 and the reception device 30 can achieve a higher throughput in a wireless communication having a large propagation loss as the millimeter-wave communication.

Explanation is continued, returning back to FIG. 6. After the RF precoding matrixes of the transmission device 20 and the reception device 30 are calculated at step S100, each of the respective RF units 26 of the transmission device 20 transmits a reference signal through the subarray 211 to which a weight corresponding to the RF precoding matrix is set (S101).

Each of the RF units 33 of the reception device 30 subjects a signal received through the subarray 311 to which a weight corresponding to the RF precoding matrix is set to processing such as quadrature detection. Each of the RF units 33 then outputs the processed reception signal to the MIMO detecting unit 34 and the estimating unit 40. The estimating unit 40 estimates an equivalent MIMO channel and an SNR of the baseband based on the reference signal included in the reception signal output from each of the RF unit 33 (S102). The estimating unit 40 outputs the estimated MIMO channel and the SNR to the MIMO detecting unit 34, the rank identifying unit 41, the stream-number determining unit 42, the precoding-matrix determining unit 43, and the SINR calculating unit 45.

Subsequently, the rank identifying unit 41 identifies a rank of a propagation path between the transmission device 20 and the reception device 30 based on the MIMO channel and the SNR of the baseband estimated by the estimating unit 40 (S103). The rank identifying unit 41 then outputs information about the calculated rank to the stream-number determining unit 42.

Method of Identifying Rank

The equivalent MIMO channel $H_b$ of a baseband estimated by the estimating unit 40 is expressed as Equation (15) below by performing SVD.

$$H_b = U_b D_b V_b^H \quad (15)$$

In above Equation (15), $D_b$ is a diagonal matrix having a singular value as a diagonal value, and the singular value has relationship expressed by Equation (16) below.

$$\sqrt{\lambda_1(H_b)} \geq \sqrt{\lambda_2(H_b)} \geq \ldots, \sqrt{\lambda_N(H_b)} \quad (16)$$

Moreover, an eigen value, which is a square of the singular value has relationship of $\lambda_1(H_b) \geq \lambda_2(H_b) \geq \ldots \geq \lambda_N(H_b)$. The rank identifying unit 41 identifies, for example, the number of an eigen value $\lambda_i$ that is larger than a predetermined threshold $t_{d1}$ as a value of the rank among eigen values $\lambda_i$. The rank identifying unit 41 may normalize the eigen values $\lambda_i$ with the eigen value $\lambda_i$ that is a maximum value among the eigen values $\lambda_i$, and may identify the number of the eigen values $\lambda_i$ that is larger than the predetermined threshold $t_{d1}$ as the value of the rank. In the following, when the value of a rank is n, the rank is expressed as rank n in some cases.

Figure 11:
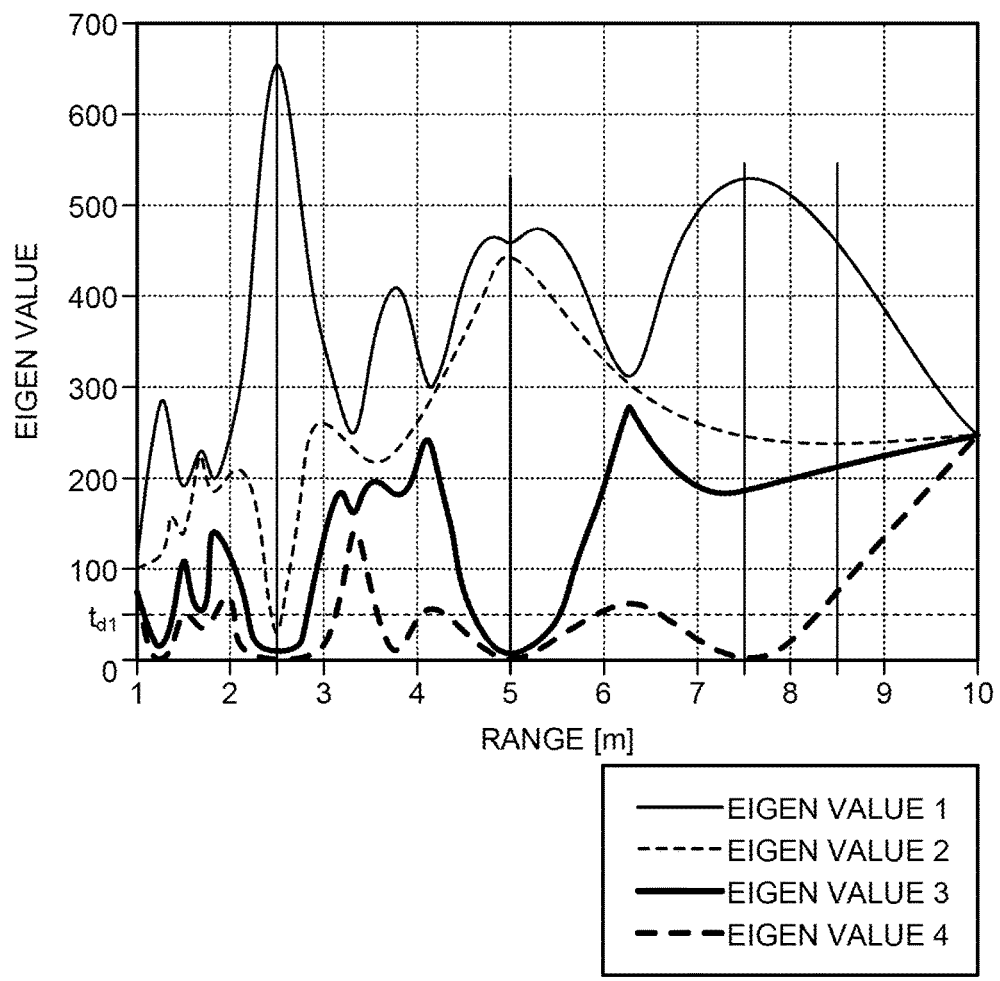
FIG. 11 depicts one example of a simulation result of an eigen value.

FIG. 11 depicts one example of a simulation result of an eigen value. In FIG. 11, a horizontal axis indicates a distance between the transmission device 20 and the reception device 30, and a vertical axis indicates a normalized eigen value. The threshold $t_{d1}$ is assumed to be 50, for example. Referring to FIG. 11, when the distance between the transmission device 20 and the reception device 30 is 2.5 m, the number of the eigen values $\lambda_1$ that are larger than the threshold $t_{d1}$ is 1, and therefore, the value of the rank is 1. Moreover, when the distance between the transmission device 20 and the reception device 30 is 5 m, the number of the eigen values $\lambda_1$ that are larger than the threshold $t_{d1}$ is 2, and therefore, the value of the rank is 2. Furthermore, when the distance between the transmission device 20 and the reception device 30 is 7.5 m, the number of the eigen values $\lambda_1$ that are larger than the threshold $t_{d1}$ is 3, and therefore, the value of the rank is 3. Moreover, when the distance between the transmission device 20 and the reception device 30 is 8.5 m, the number of the eigen values $\lambda_1$ that are larger than the threshold $t_{d1}$ is 4, and therefore, the value of the rank is 4.

The rank identifying unit 41 may identify a rank based on a ratio between the eigen value $\lambda_1$ having the largest value among the eigen values $\lambda_i$ and other eigen values $\lambda_2$ to $\lambda_N$. Specifically, the rank identifying unit 41 may calculate $SR_i$ that is obtained by dividing the eigen value $\lambda_1$ by each of the eigen values $\lambda_i$, for example, as Equation (17) below, and may identify a value of a rank based on the value of $SR_i$.

$$SR_2 = \frac{\sqrt{\lambda_1(H_b)}}{\sqrt{\lambda_2(H_b)}}, SR_3 = \frac{\sqrt{\lambda_1(H_b)}}{\sqrt{\lambda_3(H_b)}}, \ldots, SR_N = \frac{\sqrt{\lambda_1(H_b)}}{\sqrt{\lambda_N(H_b)}} \quad (17)$$

When identifying the rank based on $SR_i$ indicated in above Equation (17), the rank identifying unit 41 determines whether $SR_i$ is larger than a predetermined threshold $t_{d2}$ sequentially from i=2 to N, and when detecting $SR_i$ larger than the threshold $t_{d2}$, identifies the value of i−1 as the value of the rank. When $SR_N$ is equal to or smaller than the threshold $t_{d2}$, the rank identifying unit 41 identifies N as the value of the rank.

Method of Determining Number of Data Streams

Explanation is continued, referring back to FIG. 6. The stream-number determining unit 42 determines the number of data streams based on the SNR estimated by the estimating unit 40 and the rank identified by the rank identifying unit 41 (S104). The stream-number determining unit 42 outputs the determined number of data streams to the precoding-matrix determining unit 43.

Figure 12:
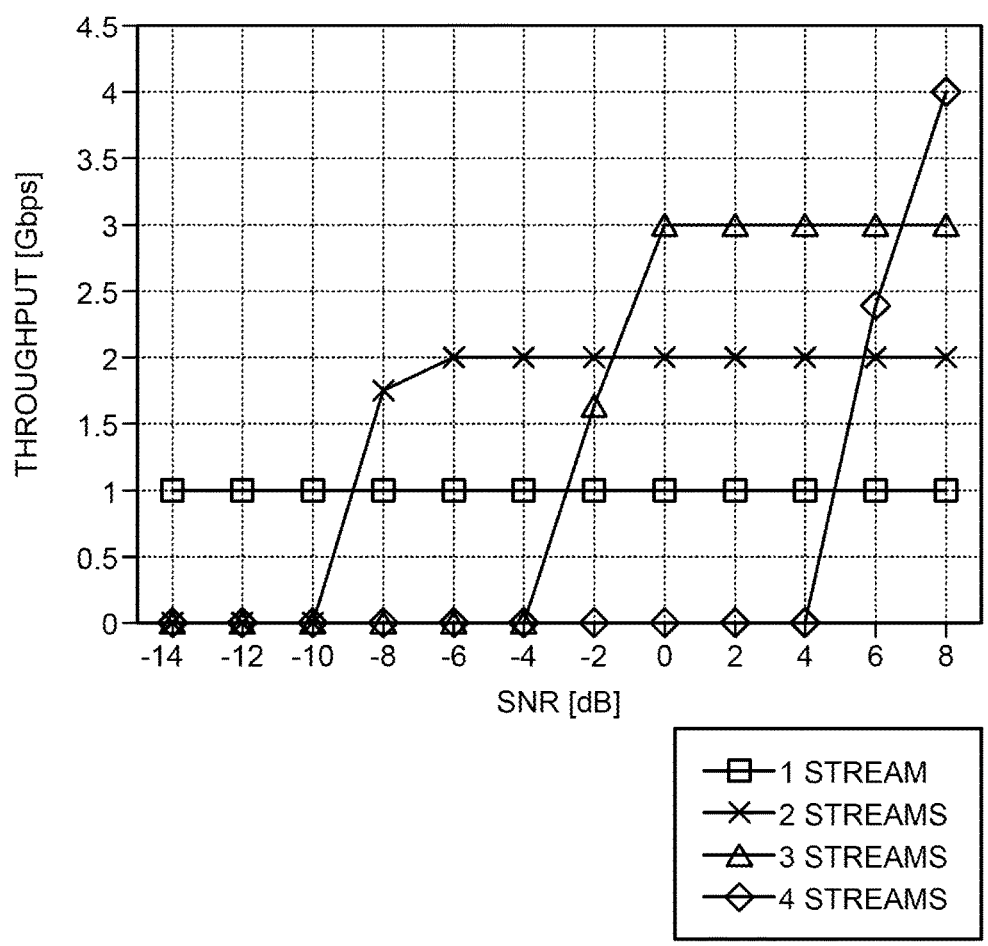
FIG. 12 depicts one example of a throughput in rank 1.
Figure 13:
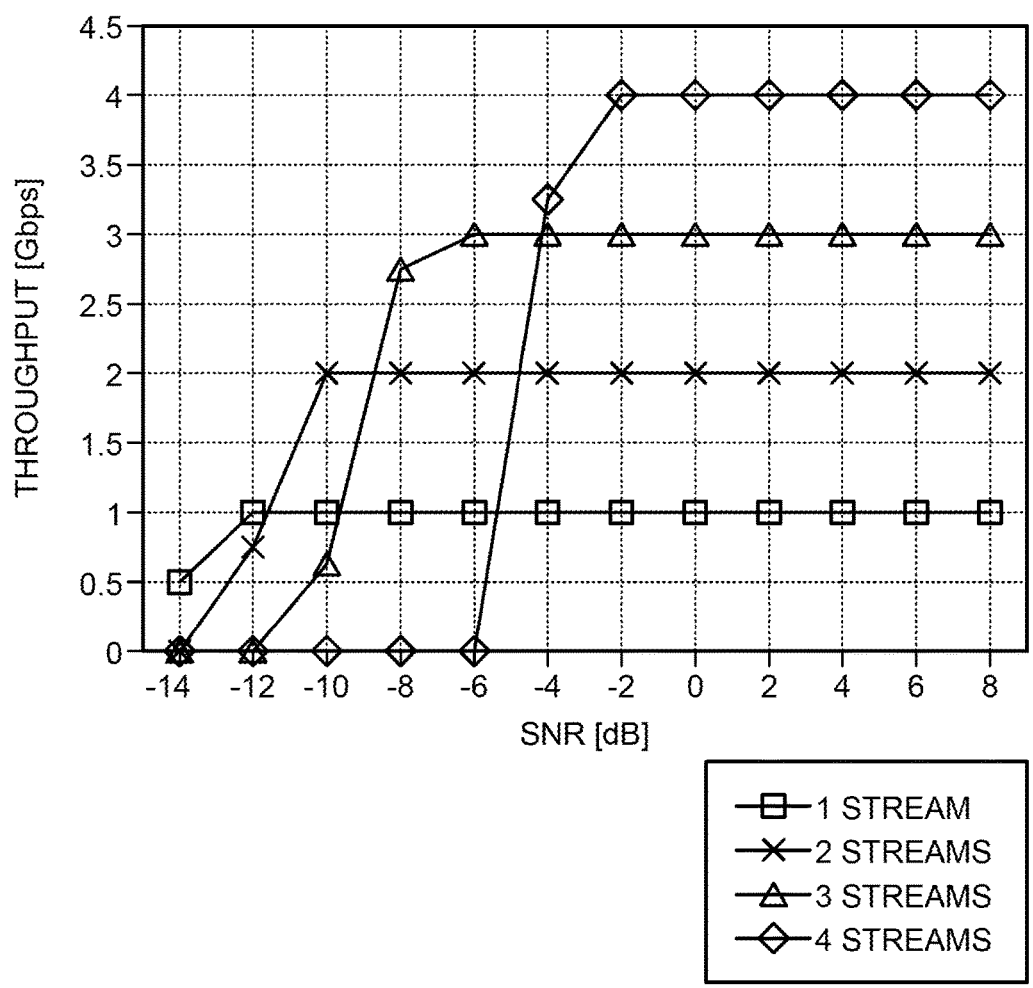
FIG. 13 depicts one example of a throughput in rank 2.
Figure 14:
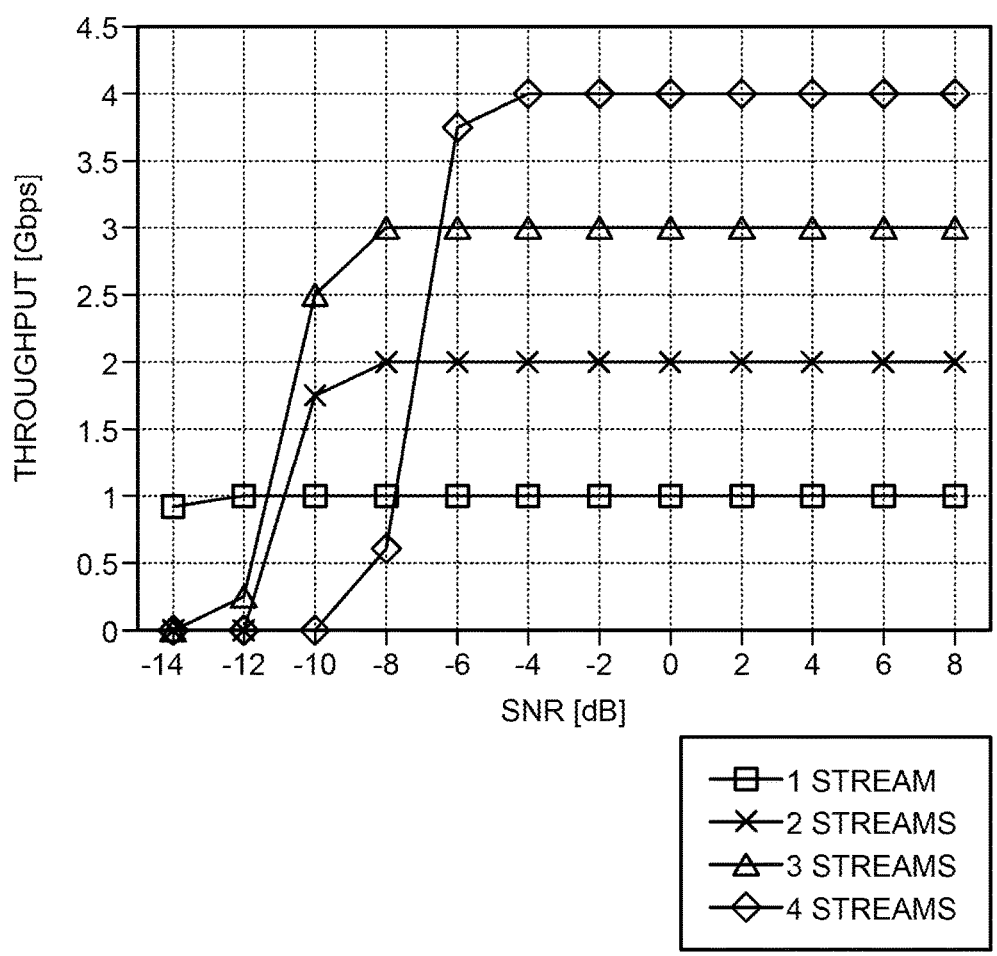
FIG. 14 depicts one example of a throughput in rank 3.
Figure 15:
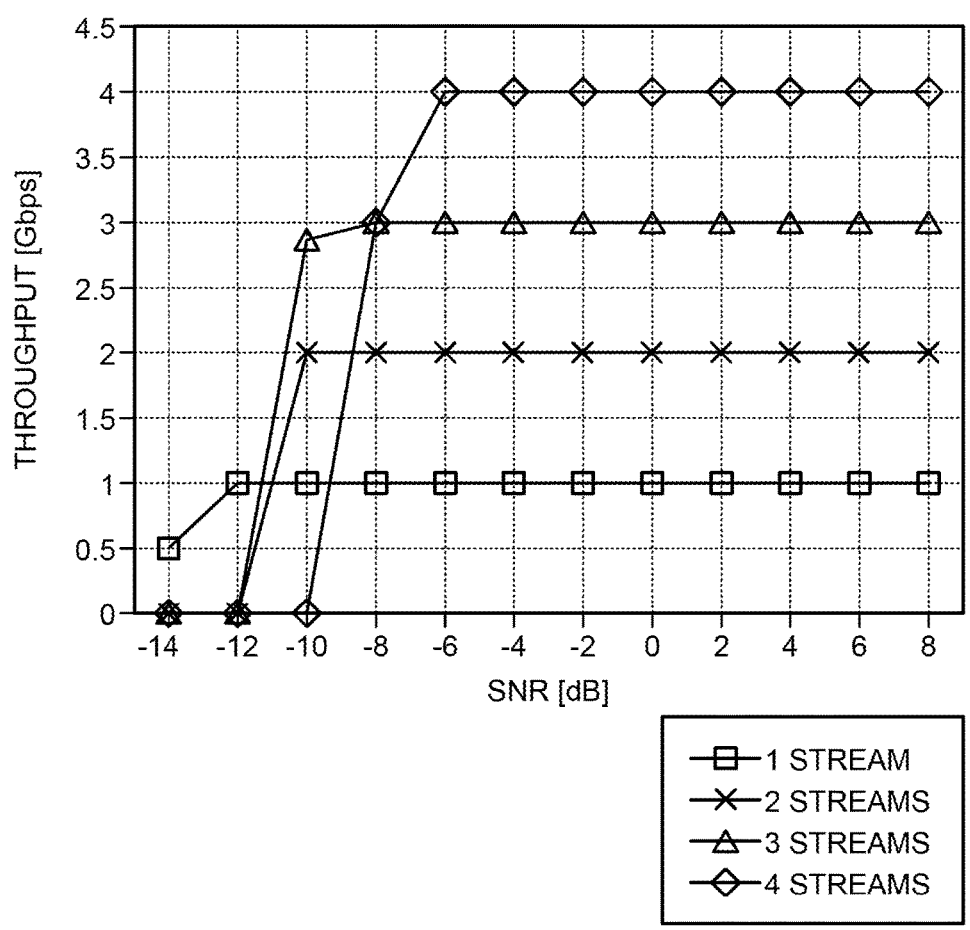
FIG. 15 depicts one example of a throughput in rank 4.

Relationship between the number of data streams and an SNR per rank is explained herein. FIG. 12 depicts one example of a throughput in rank 1. FIG. 13 depicts one example of a throughput in rank 2. FIG. 14 depicts one example of a throughput in rank 3. FIG. 15 depicts one example of a throughput in rank 4. In FIG. 12 to FIG. 15, a vertical axis indicates a throughput, and a horizontal axis indicates an SNR of a reception signal. Furthermore, one data stream is normalized by 1 gigabit per second (Gbps).

FIG. 12 to FIG. 15 indicate results of simulation that is performed under following conditions. That is, the number of the RF units 26 of the transmission device 20 is 4, and a frequency of a signal transmitted from the transmission device 20 is 60 gigahertz (GHz). Moreover, the distance R between the transmission device 20 and the reception device 30 is set to 10 m, and $D_r D_t$ is determined using Equation (8) described above. By varying R in a range of 0 m to 10 m, the rank is determined. As the number of the RF units 26 of the transmission device 20 is 4, communication is enabled with the number of data streams from 1 to 4.

For example, as indicated in FIG. 12, when the number of data streams is 1 in rank 1, a throughput of 1 Gbps is achieved when a value of SNR is within a range indicated in FIG. 12. However, when the value of SNR is in a range from −6 decibels (dB) and higher, a throughput of 2 Gbps is achieved in the case of the number of data streams being 2. Furthermore, when the value of SNR is in a range from 0 dB and higher, a throughput of 3 Gbps is achieved in the case of the number of data streams being 3. Moreover, when the value of SNR is within a range from 8 dB and higher, a throughput of 4 Gbps is achieved in the case of the number of data stream being 4.

As described, in rank 1, when the SNR is high, the throughput can be increased if the number of data streams is larger than the value of the rank. Referring to FIG. 13 to FIG. 15, also when the value of the rank is 2 or larger, the throughput can be increased if the number of data streams is larger than the value of the rank.

Furthermore, for example, as depicted in FIG. 12, when the number of data streams is 2 in rank 1, the throughput is approximately 0 when the value of SNR is in a range from −10 dB and lower. Moreover, when the number of data streams is 3, the throughput is substantially 0 when the value of SNR is in a range from −4 dB and lower. Furthermore, when the number of data streams is 4, the throughput is substantially 0 when the value of SNR is in a range from 4 dB and lower.

As described, in rank 1, when the SNR is low, the throughput is difficult to be increased if the number of data streams is larger than the value of the rank. From FIG. 13 to FIG. 15, it is found that even in the case of the value of the rank being 2 or larger, the throughput is difficult to be increased if the number of data streams is larger than the value of the rank when the SNR is low.

Therefore, in the present embodiment, the number of data streams that enables to increase the throughput is measured per range of SNR in advance, and a threshold table that includes a threshold indicating a range of SNR is created. The stream-number determining unit 42 holds the created threshold table. Furthermore, the stream-number determining unit 42 holds a throughput table in which a throughput per 1 data stream is associated with each MCS. The stream-number determining unit 42 refers to the threshold table, to identify the number of data streams per MCS based on the SNR estimated by the estimating unit 40 and the rank identified by the rank identifying unit 41. The stream-number determining unit 42 refers to the throughput table to determine a combination of an MCS and the number of data streams that maximizes the throughput among the numbers of data streams that are identified per MCS.

FIG. 16 depicts one example of a throughput table 50. The throughput table 50 stores an MCS 501 and a throughput 502 per one data stream, associating with an index 500 to identify each MCS, for example, as depicted in FIG. 16. The throughput table 50 is one example of a second table.

FIG. 17 depicts one example of a threshold table 51. The threshold table 51 has an individual table 511 for each index 510 to identify each MCS. In each of the individual table 511, a threshold 513 is stored per rank 512. The threshold table 51 is one example of a first table.

FIG. 18 and FIG. 19 are diagrams for explaining a method of using the threshold table 51. For example, as depicted in FIG. 18, in each of the individual table 511, thresholds that are associated with rank 1 are defined as $t_{11}$, $t_{12}$, and $t_{13}$, and thresholds that are associated with rank 2 are defined as $t_{21}$, $t_{22}$, and $t_{23}$. Furthermore, thresholds that are associated with rank 3 are defined as $t_{31}$, $t_{32}$, and $t_{33}$, and thresholds that are associated with rank 4 are defined as $t_{41}$, $t_{42}$, and $t_{43}$.

For example, as depicted in FIG. 19, when ρ that indicates a value of the SNR is smaller than the threshold $t_{11}$ in rank 1, 1 is selected as the number of data streams, and when ρ takes a value within a range of values equal to or larger than the threshold $t_{11}$ and smaller than the threshold $t_{12}$, 2 is selected as the number of data streams. Furthermore, in rank 1, when ρ takes a value within a range of values equal to or larger than the threshold $t_{12}$ and smaller than the threshold $t_{13}$, 3 is selected as the number of data streams, and when ρ takes a value equal to or larger than the threshold $t_{13}$, 4 is selected as the number of data streams. The same applies for respective thresholds associated with other ranks. Although the maximum value of the number of data streams in the threshold table 51 depicted in FIG. 17 to FIG. 19 is 4, the maximum value of the number of data steams may be 3 or smaller, or 5 or larger. In the individual table 511 of the threshold table 51, (the maximum value−1) pieces of thresholds are stored for each rank.

In the individual table 511 depicted in FIG. 17, the threshold $t_{31}$ and the threshold $t_{32}$ associated with rank 3 are both "−10 dB". In this case, since ρ which is equal to or larger than the threshold $t_{31}$ and smaller than the threshold $t_{32}$ in rank 3 does not exist, 2 is not selected as the number of data streams. In the individual table 511 depicted in FIG. 17, the same applies to the threshold $t_{41}$ and the threshold $t_{42}$ in rank 4.

Method of Determining Threshold

Figure 20:
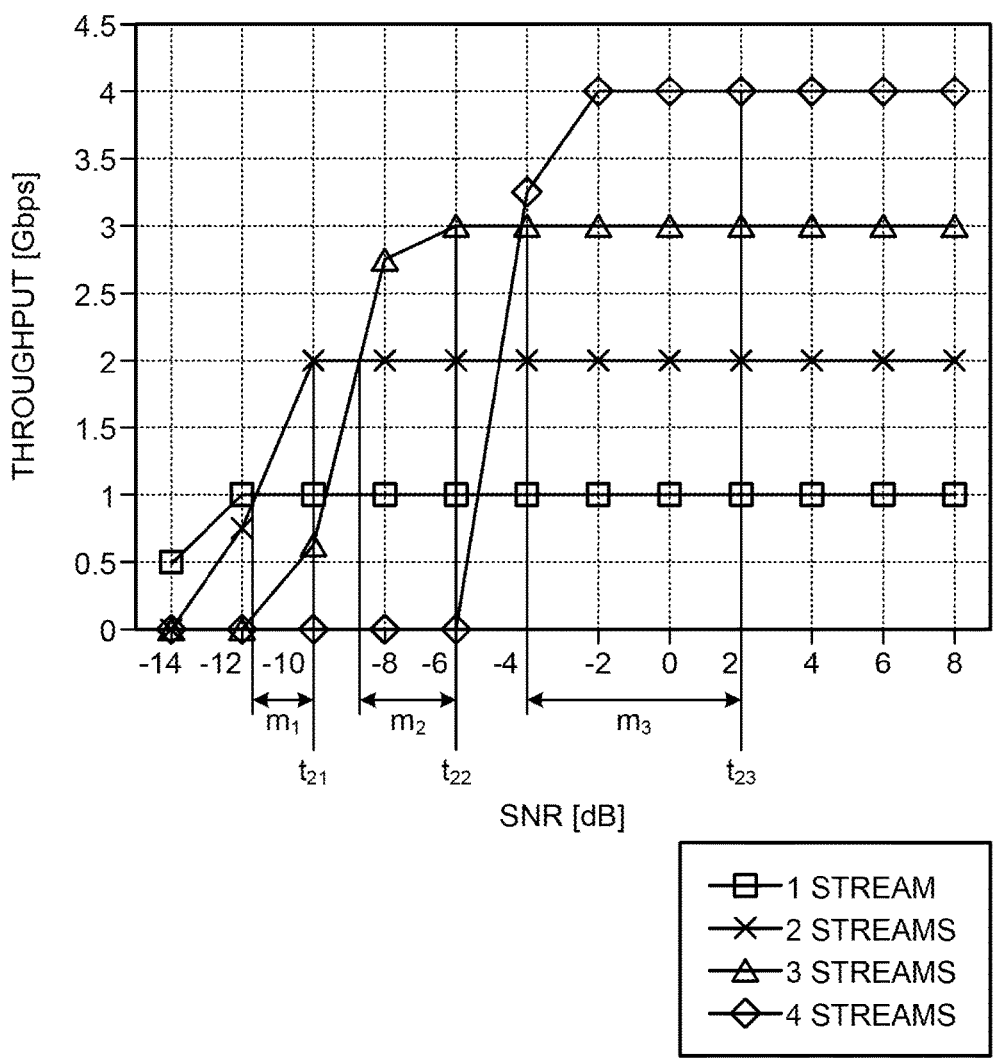
FIG. 20 depicts one example of a method of determining a threshold.

Next, a method of determining a threshold in each rank is explained. FIG. 20 depicts one example of the method of determining a threshold. In FIG. 20, as one example, a result of throughput simulation in rank 2 depicted in FIG. 13 is used. For example, referring to FIG. 20, it is found that a point at which the number of data streams enabling to increase the throughput changes from 1 to 2 is when the SNR becomes higher than −11.5 dB when viewed from a low SNR side. However, considering fluctuation in measurement values, it is preferable to give a predetermined margin $m_1$ to −11.5 dB. Therefore, in the present embodiment, the threshold $t_{21}$ to change the number of data streams from 1 to 2 is determined, for example, to −10 dB.

Moreover, referring to FIG. 20, it is found that a point at which the number of data streams enabling to increase the throughput from 2 to 3 is when the SNR becomes higher than −8.5 dB. However, considering fluctuations in measurement values and the like, it is preferable to give a predetermined margin $m_2$ to −8.5 dB. Therefore, in the present embodiment, the threshold $t_{22}$ to change the number of data streams from 2 to 3 is determined, for example, to −6 dB.

Furthermore, referring to FIG. 20, it is found that a point at which the number of data streams enabling to increase the throughput from 3 to 4 is when the SNR becomes higher than −4 dB. However, considering fluctuations in measurement values and the like, it is preferable to give a predetermined margin $m_3$ to −4 dB. The value of a margin to be set when the value of rank is smaller than that of the number of data streams and a difference between the values of the rank and the number of data streams is 2 or larger is preferable to take a value larger than the margin set for the number of data streams having a difference from the value of the rank is smaller than 2. In the example in FIG. 20, a value larger than that of either of the margin $m_1$ and margin $m_2$ is applied to the margin $m_3$. Therefore, the threshold $t_{23}$ to change the number of data streams from 3 to 4 to obtain a higher throughput is determined, for example, to 2 dB.

The respective thresholds $t_{11}$ to $t_{13}$ in rank 1, the respective thresholds $t_{31}$ to $t_{33}$ in rank 3, and the respective thresholds $t_{41}$ to $t_{43}$ in rank 4 are also determined by a procedure similar to that of the respective thresholds $t_{21}$ to $t_{23}$ in rank 2.

The stream-number determining unit 42 refers to the throughput table 50 after determining the number of data streams per MCS, and determines a combination of an MCS and the number of data streams that maximizes the throughput, from among the numbers of data streams determined per MCS. The stream-number determining unit 42 outputs the determined combination of the MCS and the number of data streams to the precoding-matrix determining unit 43.

Procedure for Determining Combination of MCS and Number of Data Streams

Figure 21:
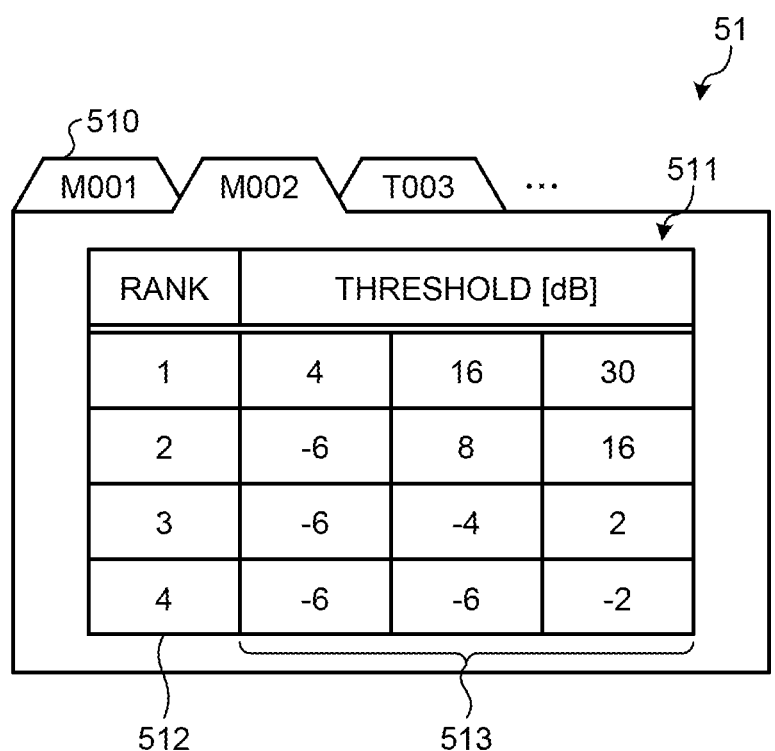
FIG. 21 depicts one example of the threshold table.

A procedure for determining a combination of an MCS and the number of data streams is explained with a specific example. For example, as depicted in FIG. 16, it is assumed that the throughput per one data stream is "2.772 Gbps" when the MCS is "16QAM-1/2", and the throughput per one data stream is "4.158 Gbps" when the MCS is "16QAM-3/4". Moreover, it is assumed that in the threshold table 51, the individual table 511 when the MCS is "16QAM-1/2" is the individual table 511 depicted in FIG. 17, and that individual table 511 when the MCS is "16QAM-3/4" is the individual table 511 depicted in FIG. 21.

For example, when the SNR estimated by the estimating unit 40 is "0 dB", and the rank identified by the rank identifying unit is "1", the stream-number determining unit 42 refers to the individual table 511 in FIG. 17 for "16QAM-1/2" of the MCS, to identify "2" as the number of data streams. Furthermore, the stream-number determining unit 42 refers to the individual table 511 in FIG. 21 for "16QAM-3/4" of the MCS, to identify "1" as the number of data streams.

The stream-number determining unit 42 refers to the throughput table 50 depicted in FIG. 16, and calculates the throughput that is achieved with two data streams in "16QAM-1/2" of the MCS to acquire 2.772 Gbps×2=5.544 Gbps. Moreover, the stream-number determining unit 42 refers to the throughput table 50 depicted in FIG. 16, and calculates the throughput that is achieved with one data stream in "16QAM-3/4" of the MCS to acquire 4.158 Gbps. The throughput when the MCS is "16QAM-1/2" and the number of data streams is "2" is larger than the throughput when the MCS is "16QAM-3/4" and the number of data stream is "1". Therefore, for example, when the SNR is "0 dB" and the rank is "1", the stream-number determining unit 42 determines the combination of an MCS and the number of data streams as "16QAM-1/2" and "2".

For example, the SNR estimated by the estimating unit 40 is "−4 dB", and the rank identified by the rank identifying unit 41 is "3", the stream-number determining unit 42 refers to the individual table 511 in FIG. 17 for "16QAM-1/2" of the MCS, to identify "4" as the number of data streams. Furthermore, the stream-number determining unit 42 refers to the individual table 511 in FIG. 21 for "16QAM-3/4" of the MCS, to identify "3" as the number of data streams.

The stream-number determining unit 42 then refers to the throughput table 50 depicted in FIG. 16, and calculates the throughput that is achieved with four data streams in "16QAM-1/2" of the MCS to acquire 2.772 Gbps×4=11.088 Gbps. Moreover, the stream-number determining unit 42 refers to the throughput table 50 depicted in FIG. 16, and calculates the throughput that is achieved with three data streams in "16QAM-3/4" of the MCS to acquire 4.158 Gbps×3=12.474 Gbps. The throughput when the MCS is "16QAM-1/2" and the number of data streams is "4" is smaller than the throughput when the MCS is "16QAM-3/4" and the number of data stream is "3". Therefore, for example, when the SNR is "−4 dB" and the rank is "3", the stream-number determining unit 42 determines the combination of an MCS and the number of data streams as "16QAM-3/4" and "3".

Throughput Achieved in Present Embodiment

Figure 22:
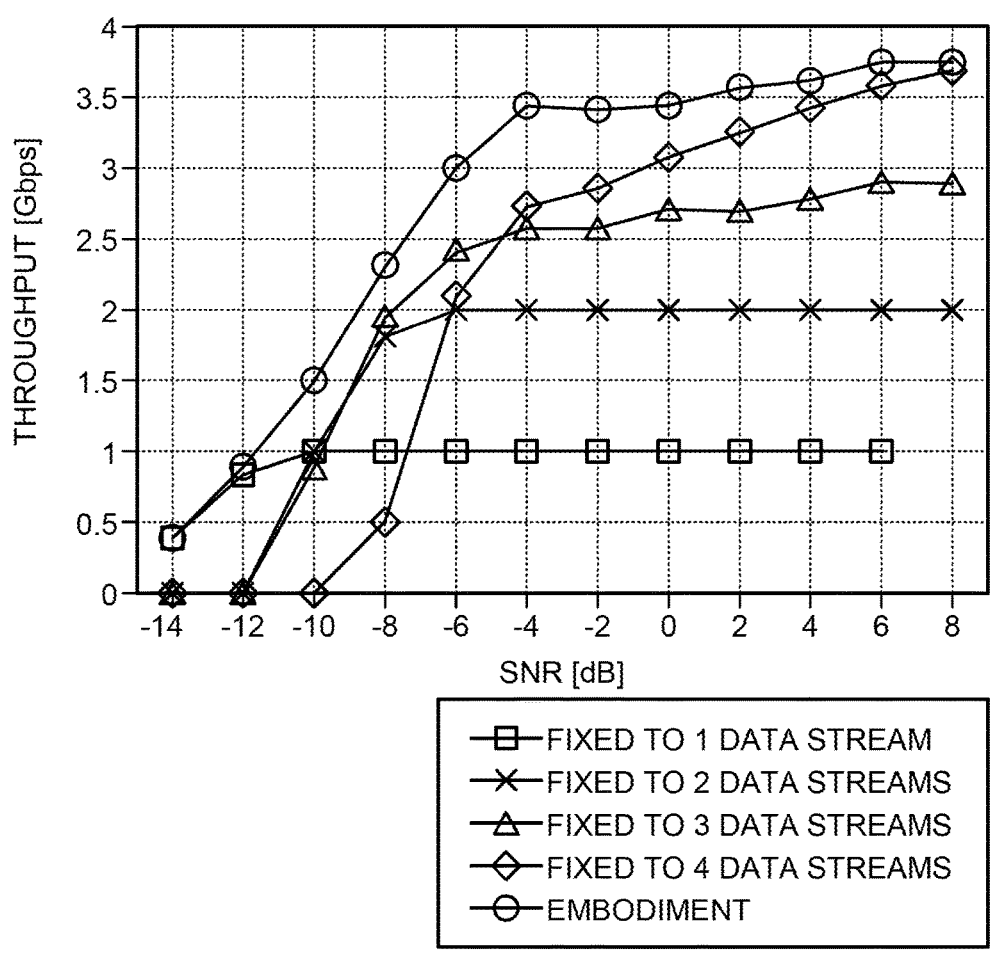
FIG. 22 depicts one example of a simulation result of an average throughput.
Figure 23:
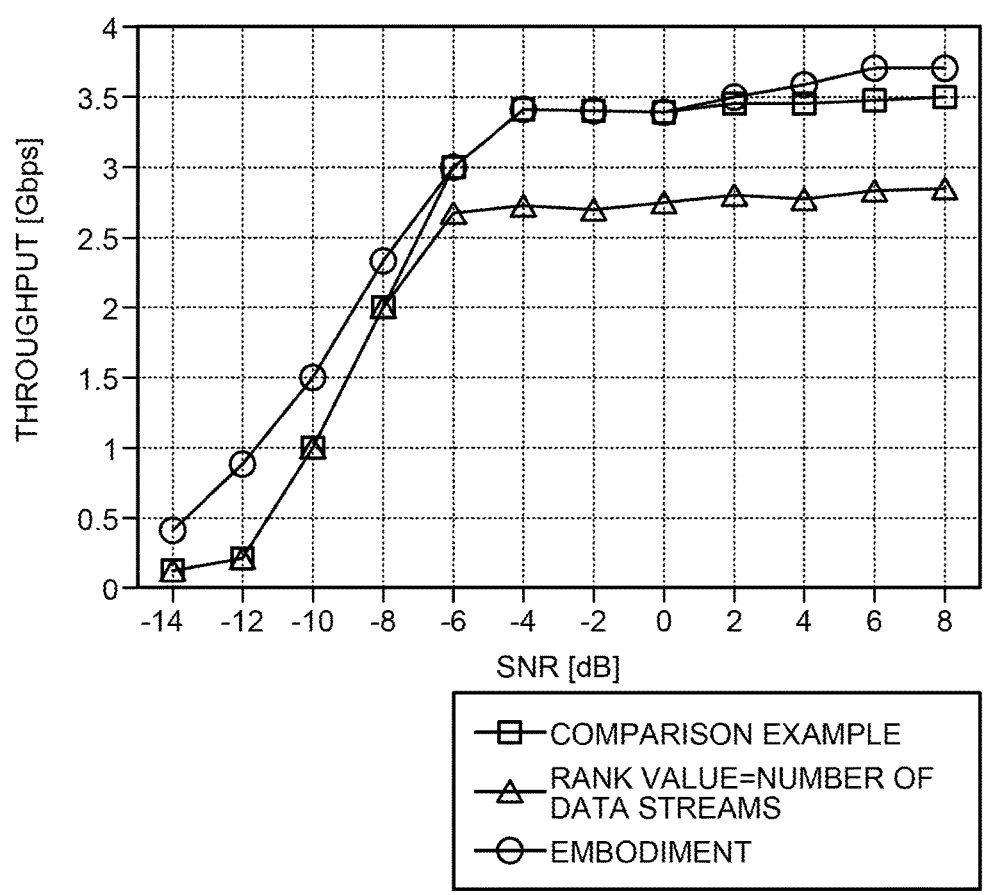
FIG. 23 depicts one example of a simulation result of an average through put.

FIG. 22 and FIG. 23 depict one example of a simulation result of an average throughput. FIG. 22 depicts a throughput when the number of data streams is fixed to either of 1 to 4, and a throughput that is achieved in the present embodiment. FIG. 23 depicts a throughput that is achieved in a comparison example, a throughput when a value of rank and the number of data streams is the same, and a throughput that is achieved in the present embodiment. In the comparison example, when the value of SNR is equal to or higher than a predetermined threshold, the value of rank+1 is used as the number of data streams, and when the value of SNR is lower than the predetermined threshold, the value of rank is used as the number of data streams.

FIG. 22 and FIG. 23 indicate results of simulation performed under the following conditions. That is, the K factor is 10 dB, the number of the RF units 26 of the transmission device 20 is 4, the number of the transmission antennas 21 in the subarray 211 is 8, and the MCS is 16QAM-1/2. Furthermore, in the antenna arrangement depicted in FIG. 4, the values are randomly varied in a range of R=1 m to 10 m, y=−5 m to +5 m, $\theta_r$=−90° to +90°.

Referring to FIG. 22, it is found that the throughput in the present embodiment is higher than a throughput when the number of data streams is fixed with any SNR. Moreover, referring to FIG. 23, it is found that the throughput in the present embodiment is higher than a throughput when a rank and the number of data streams take the same value with any SNR. Furthermore, referring to FIG. 23, it is found that the throughput in the present embodiment is equivalent or higher than a throughput in the comparison example. Therefore, according to the wireless communication system 10 of the present embodiment, the throughput can be improved.

Procedure for Determining BB Precoding Matrix

Explanation is continued, returning back to FIG. 6. The precoding-matrix determining unit 43 refers to the code book 430 storing multiple BB precoding matrixes, to identify BB precoding matrixes that are associated with the number of data streams determined by the stream-number determining unit 42. With each of the BB precoding matrixes, an index is associated.

As the code book 430, for example, a code book that is used in a long term evolution-advanced (LTE-A) or worldwide interoperability for microwave access (WiMAX) may be used. Moreover, when the maximum value of the number of data streams is less than the number of the RF units 26 of the transmission device 20, a DFT code book using combinations of columns in a DFT matrix of N×N are used as code words can be used. In the DFT code book, the number of code words is $N!/(N_s!(N-N_s)!)$.

The precoding-matrix determining unit 43 determines a BB precoding matrix that satisfies a predetermined selection criterion among the identified BB precoding matrixes by using the SNR estimated by the estimating unit 40 (S105). In the present embodiment, the precoding-matrix determining unit 43 determines a BB precoding matrix based on, for example, a maximum minimum SINR criterion. As another example, the precoding-matrix determining unit 43 may determine a BB precoding matrix based on criteria such as a maximum capacity, an MMSE, the minimum number of conditions, and the like.

The precoding-matrix determining unit 43 determines a BB precoding matrix based on the maximum minimum SINR criterion by using, for example, Equation (18) and Equation (19) below.

$$P = \underset{P \in P_C}{\arg\max} \min_{j \in [1,\ldots,N_s]} (SINR_P^j) \quad (18)$$

$$SINR_P^j = \frac{\rho}{N_s[((H_b P_p)^H (H_b P_p))^{-1}]_{j,j}} \quad (19)$$

In above Equation (18) and Equation (19), $P_c$ is the code book 430, $N_s$ is the number of data streams, and $P_p$ is a code word in the code book 430.

The precoding-matrix determining unit 43 then outputs an index corresponding to the determined BB precoding matrix together with the MCS and the number of data streams determined by the stream-number determining unit 42 to the transmitting unit 44.

Note that the precoding-matrix determining unit 43 may create a BB precoding matrix using a column corresponding to the number of data streams that is determined by the stream-number determining unit 42, for example, in a right singular matrix $V_b$ depicted in Equation (15) described above, to feedback to the transmission device 20. However, since the data amount of the BB precoding matrix is large, the BB precoding matrix determined by the precoding-matrix determining unit 43 is preferable to be transmitted to the transmission device 20 with a compassed data amount by quantization or the like. As a compression method, a compression method regulated in institute of electrical and electronic engineers (IEEE) 802.11n or IEEE 802.11ac may be used.

Subsequently, the transmitting unit 44 feedbacks the index, the MCS, and the number of data streams to the transmission device 20 through a transmission system not illustrated (S106).

The BB-precoding-matrix setting unit 28 of the transmission device 20 refers to the code book 280 to identify multiple BB precoding matrixes that are associated with the number of data streams fed back by the reception device 30. The BB-precoding-matrix setting unit 28 further identifies a BB precoding matrix with which the index received from the reception device 30 is associated among the identified BB precoding matrixes. The BB-precoding-matrix setting unit 28 sets the identified BB precoding matrix to the BB precoding unit 25 (S107).

Subsequently, the transmission device 20 transmits data based on the MCS and the number of data streams fed back by the reception device 30 (S108). The reception device 30 receives data transmitted from the transmission device 20 (S109).

Effects of First Embodiment

As described above, the reception device 30 of the present embodiment includes the estimating unit 40, the rank identifying unit 41, the stream-number determining unit 42, the precoding-matrix determining unit 43, and the transmitting unit 44. The estimating unit 40 receives a known signal transmitted from the transmission device 20, and estimates a channel and an SNR in a baseband between the transmission device 20 and the reception device 30. The rank identifying unit 41 identifies a rank of a propagation path based on the estimated channel. The stream-number determining unit 42 determines the number of data streams based on the estimated SNR and the identified rank. The precoding-matrix determining unit 43 determines a BB precoding matrix based on the estimated SNR and the determined number of data streams. The transmitting unit 44 transmits information about the determined number of data streams and the determined BB precoding matrix to the transmission device 20. As described, the reception device 30 can improve the throughput of data received from the transmission device 20 by adaptively acquiring the number of data streams based on the SNR and the rank.

Moreover, the reception device 30 of the present embodiment includes the reception antennas 31 and the weight controller 38. The weight controller 38 controls weight of each of the reception antennas 31 according to control of weight of each of the transmission antennas 21 included in the transmission device 20, thereby calculating an RF precoding matrix that indicates a weight of each of the reception antennas 31. Furthermore, estimation of a channel and an SNR in a baseband performed by the estimating unit 40 is performed after the RF precoding matrix is calculated by the weight controller 38. Thus, a higher throughput can be achieved in a wireless communication method having a large propagation loss, such as millimeter-wave wireless communication.

Moreover, the reception device 30 of the present embodiment includes the threshold table 51 in which a threshold indicating a range of an SNR for each number of data streams is associated per rank. The stream-number determining unit 42 refers to the threshold table 51 to identify a range including an SNR estimated by the estimating unit 40 among ranges of SNR that are associated with the rank identified by the rank identifying unit 41, and determines the number of data streams corresponding to the identified range. Thus, the reception device 30 can determine the number of data streams that enables to achieve a higher throughput according to an SNR estimated by the estimating unit 40.

Furthermore, the reception device 30 of the present embodiment includes the throughput table 50 in which a throughput per one data stream is associated for each MCS. Moreover, the threshold table 51 is provided per MCS. The stream-number determining unit 42 refers to the threshold table 51 to identify the number of data stream per MCS, and refers to the throughput table 50 to determine the number of data streams in an MCS that maximizes the throughput. Thus, the reception device 30 can determine a combination of an MCS and the number of data streams that enables to achieve a higher throughput according to the SNR estimated by the estimating unit 40.

Furthermore, the reception device 30 of the present embodiment includes the code book 430 in which an index is associated per BB precoding matrix. The precoding-matrix determining unit 43 determines a BB precoding matrix that satisfies a predetermined selection criterion from among BB precoding matrixes in the code book 430, based on an SNR that is estimated by the estimating unit and the number of data streams that is determined by the stream-number determining unit 42. The precoding-matrix determining unit 43 then outputs an index that is associated with the determined BB precoding matrix to the transmitting unit 44. The transmitting unit 44 transmits the index output from the precoding-matrix determining unit 43 to the transmission device 20 as information about the BB precoding matrix.

Thus, the reception device 30 can reduce a data amount at the time of transmitting information about a BB precoding matrix to the transmission device 20.

Moreover, in the present embodiment, the rank identifying unit 41 calculates an eigen value of a channel estimated by the estimating unit 40, and identifies the number of eigen values that are equal to or larger than a predetermined threshold as a rank. Thus, the reception device 30 can identify a rank of a channel.

Furthermore, in the present embodiment, the rank identifying unit 41 may calculate an eigen value of a channel estimated by the estimating unit 40, and may identify a rank based on a ratio between a largest eigen value among the calculated eigen values and each of the calculated eigen values. Thus, the reception device 30 can identify a rank of a channel.

Second Embodiment

Figure 24:
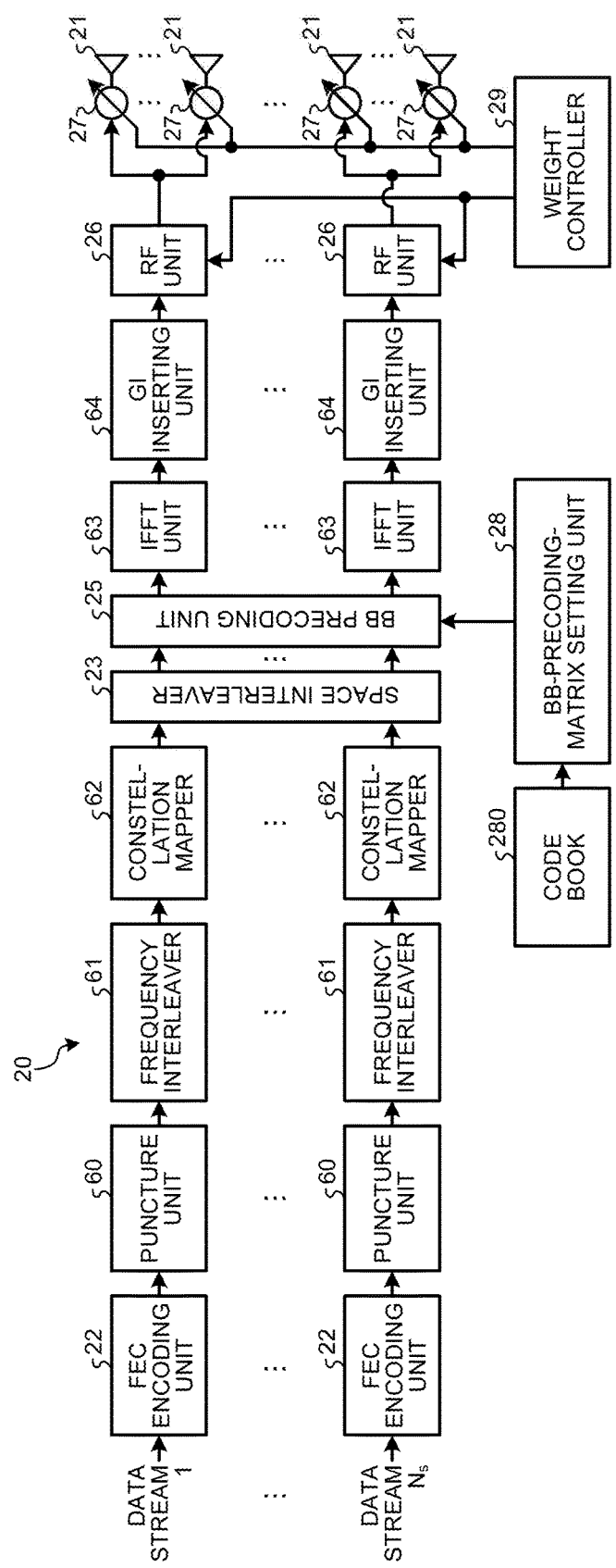
FIG. 24 is a block diagram depicting one example of a transmission device in a second embodiment.

The wireless communication system 10 of the present embodiment is a MIMO-orthogonal frequency division multiplexing (OFDM) system, and is different from the wireless communication system 10 of the first embodiment in a point that BB precoding is performed per subcarrier in the transmission device 20. FIG. 24 is a block diagram depicting one example of the transmission device 20 in a second embodiment. The transmission device 20 includes the multiple transmission antennas 21, the multiple FEC encoding units 22, the space interleaver 23, and the BB precoding unit 25. Furthermore, the transmission device 20 includes the multiple RF units 26, the multiple weight setting units 27, the BB-precoding-matrix setting unit 28, the code book 280, and the weight controller 29. Moreover, the transmission device 20 includes multiple puncture units 60, multiple frequency interleavers 61, multiple constellation mappers 62, multiple inverse fast Fourier transform (IFFT) units 63, and multiple gourd interval (GI) inserting units 64. Excluding a point explained below, a block to which a reference symbol common with FIG. 2 has the same or similar function as the block explained in FIG. 2, and therefore, explanation is omitted.

Each of the puncture units 60 subjects a data sequence that has been encoded by the FEC encoding unit 22 to puncture processing. Each of the frequency interleavers 61 switches subcarrier signals allocated to the data sequence subjected to the puncture processing by the puncture unit 60, thereby performing frequency interleave. Each of the constellation mappers 62 modulates the respective subcarrier signals subjected to the frequency interleave by the frequency interleaver 61 by using a modulation scheme corresponding to an MCS informed by the reception device 30.

The BB precoding unit 25 performs BB precoding per subcarrier based on a BB precoding matrix set by the BB-precoding-matrix setting unit 28. Each of the IFFT units 63 converts the data sequence output from the BB precoding unit 25 from a frequency region signal into a time region signal. Each of the GI inserting units 64 inserts a guard interval into the signal converted by the IFFT unit 63 to output to the RF unit 26.

Figure 25:
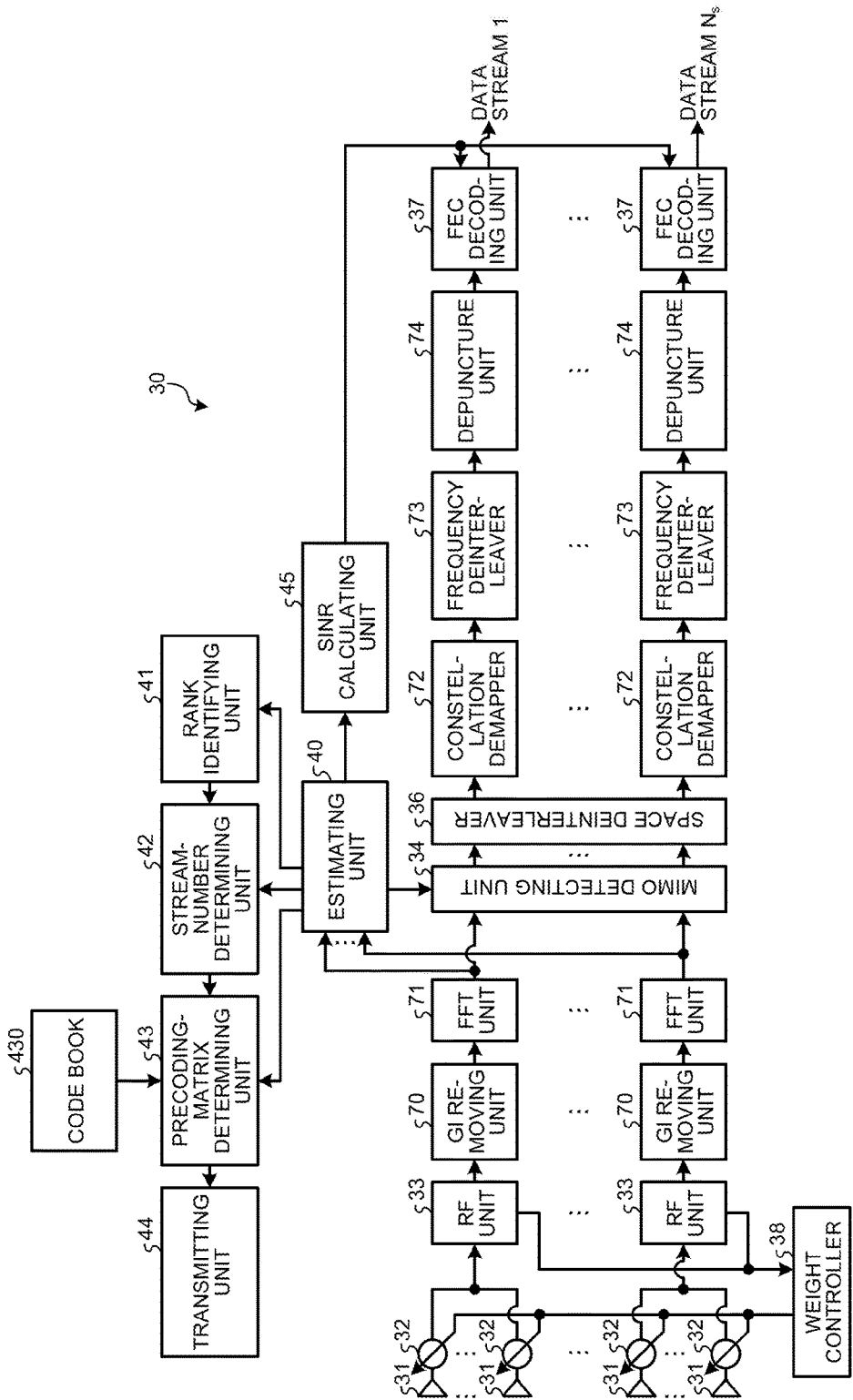
FIG. 25 is a block diagram depicting one example of a reception device in the second embodiment.

FIG. 25 is a block diagram depicting one example of the reception device 30 in the second embodiment. In the present embodiment, the reception device 30 includes the multiple reception antennas 31, the multiple weight setting units 32, the multiple RF units 33, the MIMO detecting unit 34, the space deinterleaver 36, the multiple FEC decoding unit 37, and the weight controller 38. Moreover, the reception device 30 includes the estimating unit 40, the rank identifying unit 41, the stream-number determining unit 42, the precoding-matrix determining unit 43, the code book 430, the transmitting unit 44, and the SINR calculating unit 45. Furthermore, the reception device 30 includes multiple GI removing units 70, multiple FFT units 71, multiple constellation demappers 72, multiple frequency deinterleavers 73, and multiple de-puncture units 74. Excluding a point explained below, a block to which a common reference symbol with FIG. 3 is assigned has the same or similar function as the block explained in FIG. 3, and explanation thereof is omitted.

Each of the GI removing units 70 removes the gourd interval from a reception signal subjected to processing such as decoding by the RF unit 33. Each of the FFT units 71 converts a time region signal from which the gourd interval has been removed by the GI removing unit 70 into a frequency region signal.

Each of the constellation demappers 72 demodulates a signal output from the space deinterleaver 36 based on a demodulation scheme corresponding to the modulation scheme applied by the transmission device 20. Each of the frequency deinterleavers 73 returns the subcarrier signals switched by the transmission device 20 back to an original form, thereby performing frequency deinterleave. Each of the puncture units 74 performs depuncture processing on the signal subjected to frequency deinterleave by the frequency deinterleaver 73, and outputs the processed signal to the FEC decoding unit 37.

According to the transmission device 20 and the reception device 30 of the present embodiment, the throughput of data transmitted from the transmission device 20 to the reception device 30 even in a MIMO system using OFDM can be improved.

Others

The disclosed technique is not limited to the respective embodiments described above, and various modifications can be applied within a range of the gist. For example, although in the respective embodiments described above, precoding in an RF and precoding in a BB are performed, the disclosed technique is not limited thereto. For example, in the case of a wireless communication system in which wireless communication is performed using a radio wave having a wavelength longer than a millimeter wave such as microwaves, as the propagation loss is not as serious as millimeter waves, precoding in a BB is performed but precoding in an RF is not necessary.

Moreover, although in the respective embodiments described above, the stream-number determining unit 42 refers to the threshold table 51, and identifies the number of data streams per MCS based on an SNR estimated by the estimating unit 40 and a rank identified by the rank identifying unit 41, the disclosed technique is not limited thereto. For example, the stream-number determining unit 42 may hold another threshold table including a first threshold and a second threshold for an SNR, and may determine the number of streams per MCS based on the table and an SNR estimated by the estimating unit 40.

Specifically, for example, the stream-number determining unit 42 refers to the other threshold table, and determines a value obtained by subtracting 1 from a value of the rank identified by the rank identifying unit 41 as the number of data streams when an SNR estimated by the estimating unit 40 is lower than the first threshold. Furthermore, for example, the stream-number determining unit 42 determines a value of the rank identified by the rank identifying unit 41 as the number of data streams when an SNR estimated by the estimating unit 40 is within a range from value equal to or higher than the first threshold and lower than the second threshold. Moreover, for example, the stream-number determining unit 42 determines a value obtained by adding 1 to a value of the rank identified by the rank identifying unit 41 as the number of data streams when an SNR estimated by the estimating unit 40 is equal to or higher than the second threshold. Thus, the reception device 30 can determine the number of data streams that enables to achieve a higher threshold according to an SNR that is estimated by the estimating unit 40.

According to one embodiment, a throughput in communication can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
an estimating unit that receives a known signal transmitted from a transmission device, and that estimates a channel between the transmission device and the wireless communication device and a reception signal quality;
an identifying unit that identifies a rank of a propagation path based on the channel estimated by the estimating unit;
a first determining unit that determines number of data streams based on the reception signal quality estimated by the estimating unit and the rank identified by the identifying unit;
a second determining unit that determines a precoding matrix based on the reception signal quality estimated by the estimating unit and the number of data streams determined by the first determining unit; and
a transmitting unit that transmits information about the number of data streams determined by the first determining unit and the precoding matrix determined by the second determining unit to the transmission device.

2. The wireless communication device according to claim 1, further comprising:
a plurality of reception antennas; and
a weight controller that controls a weight of each of the reception antennas according to weight control of each of a plurality of transmission antennas included in the transmission device, thereby calculating a radio frequency (RF) precoding matrix that indicates a weight of each of the reception antennas, wherein
estimation of the channel and the reception signal quality performed by the estimating unit is performed after the RF precoding matrix is calculated by the weight controller.

3. The wireless communication device according to claim 1, further comprising:
a first table in which a threshold that indicates a range of a reception signal quality for each of the number of data streams is associated with each rank, wherein
the first determining unit refers to the first table, and identifies a range that includes the reception signal quality estimated by the estimating unit among ranges of the reception signal quality that are associated with ranks identified by the identifying unit, and determines the number of data streams corresponding to the identified range.

4. The wireless communication device according to claim 1, further comprising:
a first table that stores a first threshold and a second threshold for the reception signal quality, wherein
the first determining unit refers to the first table, determines a value obtained by subtracting 1 from a value of the rank identified by the identifying unit as the number of data streams when the reception signal quality estimated by the estimating unit is lower than the first threshold, determines a value of the rank identified by the identifying unit as the number of data streams when the reception signal quality estimated by the estimating unit is within a range of a value equal to or higher than the first threshold and lower than the second threshold, and determines a value obtained by adding 1 to a value of the rank identified by the identifying unit as the number of data streams when the reception signal quality estimated by the estimating unit is equal to or higher than the second threshold.

5. The wireless communication device according to claim 3, further comprising:
a second table in which a throughput per one data stream is associated with each modulation and coding scheme (MCS), wherein
the first table is provided for each MCS, and
the first determining unit refers to the first table to identify the number of data streams of each MCS, and refers to the second table to determine the number of data streams in an MCS that maximizes a throughput.

6. The wireless communication device according to claim 1, further comprising:
a code book in which an index is associated with each precoding matrix, wherein
the second determining unit determines a precoding matrix that satisfies a predetermined selection criterion among precoding matrixes included in the code book, based on the reception signal quality estimated by the estimating unit and the number of data streams determined by the first determining unit, and outputs an index that is associated with the determined precoding matrix to the transmitting unit, and
the transmitting unit transmits the index output from the second determining unit to the transmission device as information relating to the precoding matrix.

7. The wireless communication device according to claim 1, wherein
the identifying unit calculates an eigen value of the channel estimated by the estimating unit, and identifies number of eigen values that are equal to or higher than a predetermined threshold as the rank.

8. The wireless communication device according to claim 1, wherein
the identifying unit calculates a plurality of eigen values of the channel estimated by the estimating unit, and determines the rank based on a ratio between an eigen value having a largest value among the calculated eigen values and each of the calculated eigen values.

9. A wireless communication system comprising:
a transmission device; and
a reception device, wherein
the reception device includes:
an estimating unit that receives a known signal transmitted from the transmission device, and that estimates a channel between the transmission device and the reception device and a reception signal quality;
an identifying unit that identifies a rank based on the channel estimated by the estimating unit;
a first determining unit that determines number of data streams based on the reception signal quality estimated by the estimating unit and the rank identified by the identifying unit;
a second determining unit that determines a precoding matrix based on the reception signal quality estimated by the estimating unit and the number of data streams determined by the first determining unit; and
a transmitting unit that transmits information about the number of data streams determined by the first determining unit and the precoding matrix determined by the second determining unit to the transmission device.

10. A transmission-data control method performed by a wireless communication device, the transmission-data control method comprising:
receiving a known signal transmitted from a transmission device;
estimating a channel between the transmission device and the wireless communication device and a reception signal quality;
identifying a rank based on the estimated channel;
determining number of data streams based on the estimated reception signal quality and the identified rank;
determining a precoding matrix based on the estimated reception signal quality and the determined number of data streams; and
transmitting information about the determined number of data streams and the determined precoding matrix to the transmission device.

\* \* \* \* \*